United States Patent
Kim et al.

(10) Patent No.: US 9,918,155 B2
(45) Date of Patent: Mar. 13, 2018

(54) PORTABLE SOUND EQUIPMENT

(71) Applicant: LG ELECTRONICS INC., Seoul (KR)

(72) Inventors: Donghyun Kim, Seoul (KR); Seolyong Shin, Seoul (KR); Shin Han, Seoul (KR); Youchang Kim, Seoul (KR); Hyunsun Yoo, Seoul (KR); Jungyoun Kang, Seoul (KR); Obyoung Kang, Seoul (KR); Sangwoo Seo, Seoul (KR); Jaekwang Lee, Seoul (KR); Kyoungsu Nam, Seoul (KR); Dongyun Hyun, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/359,990

(22) Filed: Nov. 23, 2016

(65) Prior Publication Data

US 2017/0195767 A1    Jul. 6, 2017

Related U.S. Application Data

(60) Provisional application No. 62/274,386, filed on Jan. 4, 2016, provisional application No. 62/274,785, filed on Jan. 5, 2016.

(30) Foreign Application Priority Data

Feb. 12, 2016 (KR) .......... 10-2016-0016490
Feb. 19, 2016 (KR) .......... 10-2016-0019997
Aug. 1, 2016 (KR) .......... 10-2016-0098177

(51) Int. Cl.
*H04R 25/00* (2006.01)
*H04R 1/10* (2006.01)
*H04R 5/033* (2006.01)

(52) U.S. Cl.
CPC ........... *H04R 1/1016* (2013.01); *H04R 1/105* (2013.01); *H04R 1/1033* (2013.01);
(Continued)

(58) Field of Classification Search
CPC .... H04R 1/1016; H04R 1/1033; H04R 1/105; H04R 1/1041; H04R 1/1066;
(Continued)

(56) References Cited

U.S. PATENT DOCUMENTS 8,948,415 B1    2/2015  Reid et al.
9,055,364 B1 *  6/2015  Uh .......................... H04R 5/033
(Continued)

FOREIGN PATENT DOCUMENTS

EP    2 500 979 A2    9/2012
EP    2 911 374 A2    8/2015
(Continued)

*Primary Examiner* — Huyen D Le
(74) *Attorney, Agent, or Firm* — Birch, Stewart, Kolasch & Birch, LLP

(57) ABSTRACT

A portable sound equipment having a body curved in C-shape, the body including an elastic part, an earbud holder provided to the body, an earbud detachably attached to the earbud holder, the earbud including a sound output module configured to output sound, a main board situated within the body, the main board configured to control the sound output module by being connected to the earbud, a sound cable connecting the earbud and the main body, a rotation module located within the body between an end portion of the body and main board, the rotation module configured to have the sound cable wound on an outer circumference thereof, a bridge coupled with the body to cover one surface of the rotation module, a flexible board disposed along the bridge and having one side connected to the main board and another side coupled to a microphone.

15 Claims, 22 Drawing Sheets

(52) U.S. Cl.
CPC ......... *H04R 1/1041* (2013.01); *H04R 1/1091* (2013.01); *H04R 5/033* (2013.01); *H04R 2201/105* (2013.01); *H04R 2201/107* (2013.01); *H04R 2420/07* (2013.01)

(58) Field of Classification Search
CPC .... H04R 1/1091; H04R 5/033; H04R 5/0335; H04R 2201/105; H04R 2201/107; H04R 2420/07
USPC ................. 381/74, 370, 374, 376, 380, 384; 379/430, 438; 181/129, 130, 135
See application file for complete search history.

(56) References Cited

U.S. PATENT DOCUMENTS

| | | | |
|---|---|---|---|
| 9,571,928 | B2 | 2/2017 | Seo et al. |
| 9,723,395 | B2* | 8/2017 | Kim ................. H04R 5/0335 |
| 2014/0119555 | A1 | 5/2014 | Lu |
| 2014/0198927 | A1* | 7/2014 | Cheng ................. H04R 1/1033 381/74 |
| 2015/0244848 | A1 | 8/2015 | Park et al. |
| 2015/0382095 | A1 | 12/2015 | Shin et al. |

FOREIGN PATENT DOCUMENTS

| | | |
|---|---|---|
| EP | 2 919 482 A2 | 9/2015 |
| KR | 20-0408656 Y1 | 2/2006 |
| KR | 10-2009-0132390 A | 12/2009 |
| KR | 10-2012-0105867 A | 9/2012 |
| KR | 10-1471904 B1 | 12/2014 |
| KR | 10-2015-0110302 A | 10/2015 |

\* cited by examiner

FIG. 6
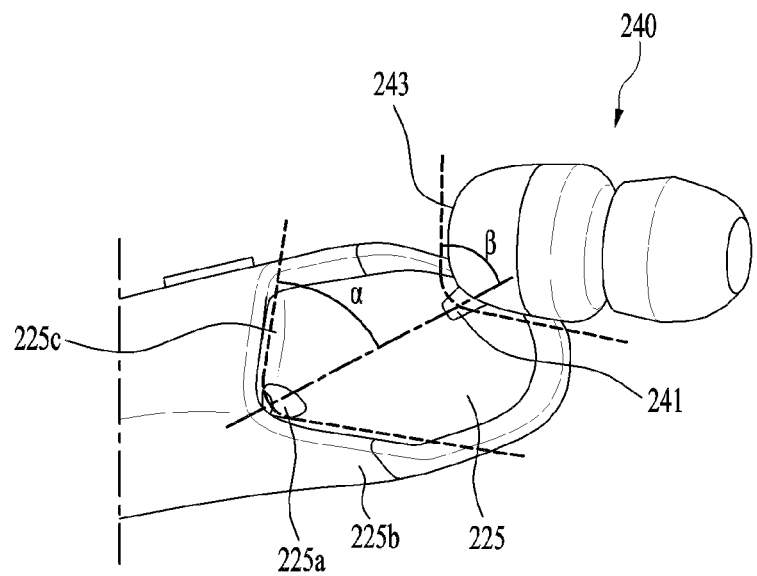
(a)
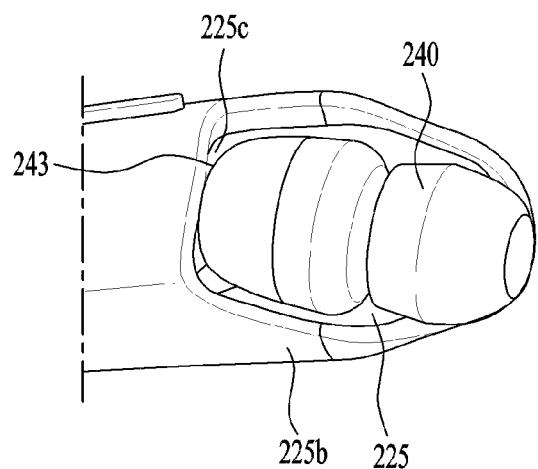
(b)

FIG. 7
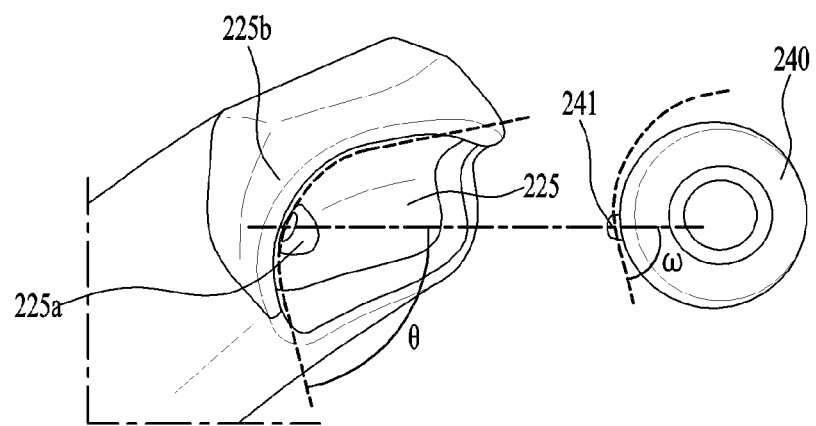
(a)
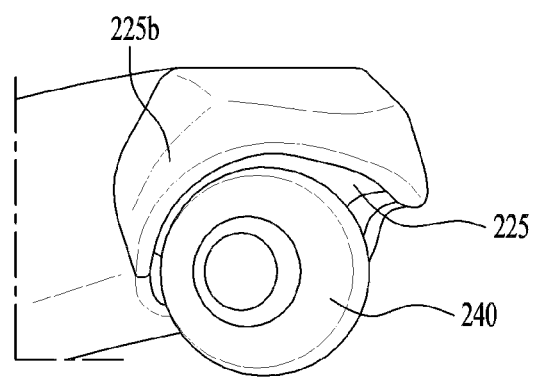
(b)

PORTABLE SOUND EQUIPMENT

Pursuant to 35 U.S.C. § 119(a) and (e), this application claims priority to U.S. Provisional Patent Application No. 62/274,386 filed on Jan. 4, 2016, U.S. Provisional Patent Application No. 62/274,785 filed on Jan. 5, 2016, Korean Patent Application No. 10-2016-0016490 filed on Feb. 12, 2016, Korean Patent Application No. 10-2016-0019997 filed on Feb. 19, 2016 and Korean Patent Application No. 10-2016-0098177 filed on Aug. 1, 2016, the entire contents of each is hereby incorporated by reference in their entireties.

BACKGROUND OF THE INVENTION

Field of the Invention

The present invention relates to a portable sound equipment. Although the present invention is suitable for a wide scope of applications, it is particularly suitable for receiving a sound signal from a mobile terminal and transmitting a control signal for controlling a terminal through wireless communication with the terminal.

Discussion of the Related Art

Sound equipment means a sound device for receiving a sound signal from a terminal and transmitting sound information collected through a microphone to the terminal. According to the related art, a portable sound equipment has employed a wired mechanism for receiving a sound signal by inserting a terminal in an ear jack of a terminal. Yet, in aspects of mobility and use convenience, the demand for portable sound equipments of wireless communication type is increasing recently.

Various portable sound equipments configured to be portable on user's body (e.g., a headphone type in shape of a band fit to a head, an ear-hung type, an ear-fit type, etc.) are being developed in consideration of portability.

SUMMARY OF THE INVENTION

Accordingly, the present invention is directed to a portable sound equipment that substantially obviates one or more problems due to limitations and disadvantages of the related art.

One object of the present invention is to provide a portable sound equipment, by which influence on peripheral parts is minimized on keeping/withdrawing an earbud in/from an earbud holder by a rotation module, by which sound cable is wound on the rotation module without being entangled, and by which the earbud holder and the earbud can be coupled in place.

Another object of the present invention is to provide a portable sound equipment, by which wireless communication performance is enhanced using a metal case externally exposed in receiving a sound signal from a terminal and transmitting a control signal for controlling the terminal by wireless communication with the terminal.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a portable sound equipment according to one embodiment of the present invention may include a body curved in U-shape, the body including an elastic part, an earbud holder provided to the body, an earbud detachably attached to the earbud holder, the earbud including a sound output module configured to output sound, a main board situated within the body, the main board configured to control the sound output module by being connected to the earbud, a sound cable connecting the earbud and a controller, a rotation module situated within the body in a direction of an end portion of the body rather than the main board, the rotation module configured to have the sound cable wound on an outer circumference of the rotation module, a bridge coupled with the body by covering one surface of the rotation module, a flexible board disposed along the bridge, the flexible board having one side connected to the main board, and a microphone coupled with the other side of the flexible board.

Preferably, the bridge further includes a cable guide projected toward the rotation module by being spaced apart in a prescribed distance from a bottom surface having the rotation module coupled therewith and the sound cable wound on a circumference of the rotation module is situated between the cable guide and the bottom surface.

More preferably, the prescribed distance between the cable guide and the bottom surface is one to three times greater than thickness of the sound cable.

Preferably, the portable sound equipment further includes an antenna module coupled with the bridge, and one side of the bridge is connected to the main board to radiate a wireless signal.

Preferably, the portable sound equipment further includes a stopper configured to restrict rotation of the rotation module in a first direction and allow rotation of the rotation module in a second direction and an elastic spring configured to rotate the rotation module in the first direction to enable the sound cable to be wound on an outer surface of the rotation module, wherein a portion of the stopper coming into contact with the rotation module includes SUS material and wherein if the earbud is pulled to be detached from the earbud holder, the rotation module is rotated in the second direction opposite to the first direction.

More preferably, the portable sound equipment further includes a storage button configured to allow the rotation of the rotation module in the first direction by spacing the stopper apart from the rotation module.

Preferably, the earbud holder further includes a horizontal portion and a cable hole formed in the horizontal portion to enable the sound cable to pass through, the earbud further includes a housing configured to have the sound output module installed therein and include a horizontal portion formed on one side and a cable holder projected from the housing to be coupled with the sound cable, and a first angle between the cable hole and the horizontal portion of the earbud holder corresponds to a second angle between the cable holder of the earbud and the horizontal portion of the earbud.

More preferably, the earbud holder is disposed to lean to one side of the horizontal portion.

Preferably, the microphone includes a pair of microphones disposed side by side.

Preferably, the body includes a lower housing configured to be coupled with the rotation module and the main board and have the earbud holder formed at an end portion and an upper housing configured to cover the rotation module and the main board by being coupled with an upper part of the lower housing and the lower housing further includes a slit formed in the earbud holder, the slit having one side open, the slit having the other side closed and a holder cap configured to cover the earbud holder and include a cable hole formed in a portion corresponding to the other side of the slit.

Preferably, the flexible board further includes a switch module situated on the other side. If the switch module is pressed, the switch module generates a signal. And, the flexible board further includes a button configured to pressurize the switch module by being externally exposed from the housing.

In another aspect of the invention, as embodied and broadly described herein, a portable sound equipment according to another embodiment of the present invention may include a body curved in C-shape, the body including an elastic part, a metal case coupled with an outer side of the body, an earbud holder provided to the body, an earbud detachably attached to the earbud holder, the earbud including a sound output module configured to output sound, a main board situated within the body, the main board configured to control the sound output module by being connected to the earbud and have a wireless communication unit installed therein, a sound cable connecting the earbud and the main board, an antenna pattern configured to transceive wireless signal by being connected to the wireless communication unit installed in the main board, and a non-conductor inserted between the antenna pattern and the metal case.

The non-conductor may be disposed in an antenna hole formed in the body.

The non-conductor may include an elastic gasket, a conductive material may be situated on both sides of the elastic gasket, and a non-conductive material may be inserted in the middle of the elastic gasket.

One end of the antenna pattern may be connected to the wireless communication unit and the non-conductor may be situated at the other end of the antenna pattern.

The body may include a case, the main board and the sound cable may be installed in the case, and the non-conductor may include a portion of the case thinner than the rest of the case.

A portion having the non-conductor situated thereat may be disposed closest to a gap between the antenna pattern and the metal case.

When the body is worn on a user's neck, the metal case may be disposed in an outer direction opposite to an inner direction toward the neck or/and at an end portion of the body.

The portable sound equipment may further include a rotation module situated within the body in a direction of an end portion of the body rather than the main board, the rotation module may be configured to have the sound cable wound on an outer circumference of the rotation module, and the antenna pattern may include a flexible board situated in a manner of overlapping the rotation module.

The portable sound equipment may further include first and second microphones disposed on one end portion of the body, and the first and second microphones may be disposed by being spaced apart from each other by a prescribed distance in a length direction of the body. If a sound level collected by the first and second microphones is greater than a reference, the controller may receive an input of sound from the first microphone only. If the sound level collected by the first and second microphones is smaller than the reference, the controller may receive an input of sound from both of the first and second microphones.

The earbud may include an earbud housing configured to install the sound output module inside by having a curved surface, a sound hole formed in one side of the earbud housing, and a cable holder projected from the other side of the earbud housing to be coupled with the sound cable, and the earbud holder may further include a seating part having a curved surface of a curvature corresponding to a shape of the earbud housing and a cable hole formed in the seating part to let the sound cable to pass through.

The seating part may include a first portion coming into contact with the other side of the earbud housing, a second portion extending from the first portion along an extending direction of the body in an inner direction toward user's neck on wearing the body on the user's neck and a third portion extending along the extending direction of the body from the first portion by coming into contact with the second portion in a front direction facing a front side on wearing the body on the user's neck, and the cable hole may be formed in the edge where the first to third portions meet one another.

In further aspect of the present invention, a portable sound equipment according to another embodiment of the present invention may include a body curved in C-shape, the body including an elastic part, a metal case coupled with an outer side of the body, an earbud holder provided to the body, an earbud detachably attached to the earbud holder, the earbud including a sound output module configured to output sound, a main board situated within the body, the main board configured to control the sound output module by being connected to the earbud, a sound cable connecting the earbud and the main board, an antenna patter configured to transceive wireless signal by being connected to the main board, and an antenna connecting part configured to connect the antenna pattern and the metal case by perforating the body.

Preferably, when the body is worn on user's neck, the metal case is disposed in an outer direction opposite to an inner direction facing the neck or/and at an end portion of the body.

Preferably, the portable sound equipment further includes a rotation module situated within the body in a direction of an end portion of the body rather than the main board, the rotation module configured to have the sound cable wound on an outer circumference of the rotation module, and the antenna pattern is situated by being superposed on the rotation module.

Preferably, the body includes an elastic band including elastic material and a pair of housings connected to both ends of the elastic band and the elastic band includes a memory alloy in wire shape, a pair of connecting parts coupled with both end portions of the memory alloy, and a first covering part configured to be deformable by enclosing the memory alloy and a portion of the connecting part.

More preferably, the portable sound equipment further includes a signal line configured to transceive a signal between a pair of the housings and a second covering part configured to cover the memory alloy and a portion of the signal line.

More preferably, both ends of the memory alloy are bent in hook shape to be locked to the connecting part.

More preferably, the portable sound equipment further includes an upper case covering one side of the connecting part, a plurality of locking holes formed in the connecting part, a plurality of screws locked to the first case through the locking holes, and a lower case covering the other side of the connecting part.

And, the portable sound equipment further includes a signal line transceiving signals between a pair of the housings and a signal line receiving part configured to receive the signal line by being separated from the locking holes.

Moreover, the signal line receiving part includes a first portion wider than thickness of the signal line and a second portion corresponding to the thickness of the signal line and wherein the first portion and the second portion are formed alternately.

Preferably, the portable sound equipment further includes first and second microphones disposed on one end portion of the body, and the first and second microphones are disposed by being spaced apart from each other by a prescribed distance in a length direction of the body.

More preferably, the first and second microphones are situated on one side of the body. If a sound level collected by the first and second microphones is greater than a reference, sound is inputted from the first microphone only. If the sound level collected by the first and second microphones is smaller than the reference, sound is inputted from both of the first and second microphones.

Preferably, the earbud includes an earbud housing configured to install the sound output module inside by having a curved surface, a sound hole formed in one side of the earbud housing, and a cable holder projected from the other side of the earbud housing to be coupled with the sound cable and the earbud holder further includes a seating part having a curved surface of a curvature corresponding to a shape of the earbud housing and a cable hole formed in the seating part to let the sound cable to pass through.

More preferably, the seating part includes a first portion coming into contact with the other side of the earbud housing, a second portion extending from the first portion along an extending direction of the body in an inner direction toward user's neck on wearing the body on the user's neck, and a third portion extending along the extending direction of the body from the first portion by coming into contact with the second portion in a front direction facing a front side on wearing the body on the user's neck.

And, the cable hole is formed on the edge where the first to third portions meet one another.

Accordingly, the present invention provides the following effects and/or features.

First of all, when an earbud is kept in or withdrawn from an earbud holder by a rotation module, influence on peripheral parts is minimized and sound cable can be wound on the rotation module without being entangled.

Secondly, since a structure for helping a user to keep an earbud easily and conveniently is provided to an earbud holder, the user can carry earbud conveniently.

Thirdly, it is able to enhance wireless communication performance using a metal case externally exposed. When an earbud is kept in or withdrawn from an earbud holder by a rotation module, influence on peripheral parts is minimized and sound cable can be wound on the rotation module without being entangled.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 and FIG. 7 are diagrams to describe a manner of coupling an earbud with an earbud holder of the present invention;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
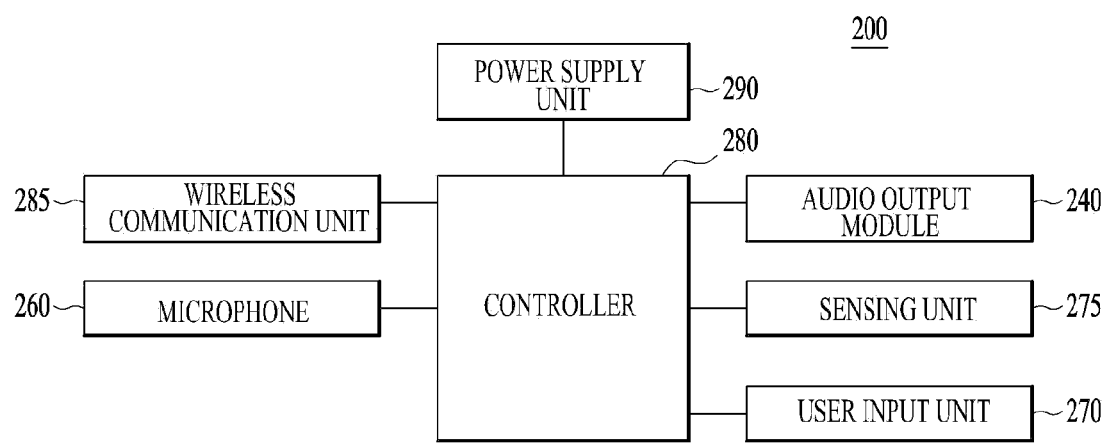
FIG. 1 is a block diagram for configuration of a portable sound equipment according to the present invention.

FIG. 1 is a block diagram for configuration of a portable sound equipment according to the present invention. A portable sound equipment 200 of the present invention may include a controller 250, a wireless communication unit 285, such as an antenna module, a sound output unit 240, a sensing unit 275, a microphone 260, a user input unit 270, and a power supply unit 290.

The sound output unit 240 is a device configured to output sound in accordance with sound signal. One representative example includes an earbud 240 configured to deliver sound by being inserted in user's ear.

The microphone 260 processes external sound signal into electrical audio data. The processed audio data is delivered to an external terminal or server through the wireless communication unit 285. In order to eliminate noise generated in the course of receiving external sound signal, various noise elimination algorithms can be implemented in the microphone 260.

The sensing unit 275 is a device for recognizing a state of the portable sound equipment 200 and a surrounding situation, and may include an illumination sensor for sensing surrounding brightness, a touch sensor for sensing a touch input, a gyro sensor for sensing an inclination and position of the portable sound equipment, an earbud switch for detecting whether the earbud 240 is located at an earbud holder 225, and the like.

As an input unit for a user to control the portable sound equipment 200, the user input unit 270 may include a call button 272, a button 273 for sound level adjustment and the like, a power button 271, a storage button 275 for keeping a sound cable in a housing 220, and the like.

The user input unit 270 may include the call button 272 and a pair of the sound level adjustment buttons 273 only, or may further include a play/stop button and a song order change button. Since a size of the portable sound equipment 200 is limited and a user frequently applies an input through the user input unit 270 without looking at the corresponding button, if the number of buttons increases, it is difficult to distinguish the functions of the respective button. Hence, it is able to expand control commands that can be inputted in a manner of combining a button pressed time, a button pressed count and a plurality of buttons using the limited number of buttons.

As the portable sound equipment 200 is normally worn on user's body, it is less probable that the portable sound equipment 200 is lost. On the contrary, when a general terminal is lost, it is able to find the lost terminal using alarm sound of the terminal connected by Bluetooth in a manner of pressing a pair of the user input units 270 at the same time for predetermined duration.

By activating a voice recording function of the Bluetooth connected terminal, voice or audio collected through the microphone 260 of the portable sound equipment 200 can be saved to the terminal.

Figure 2:
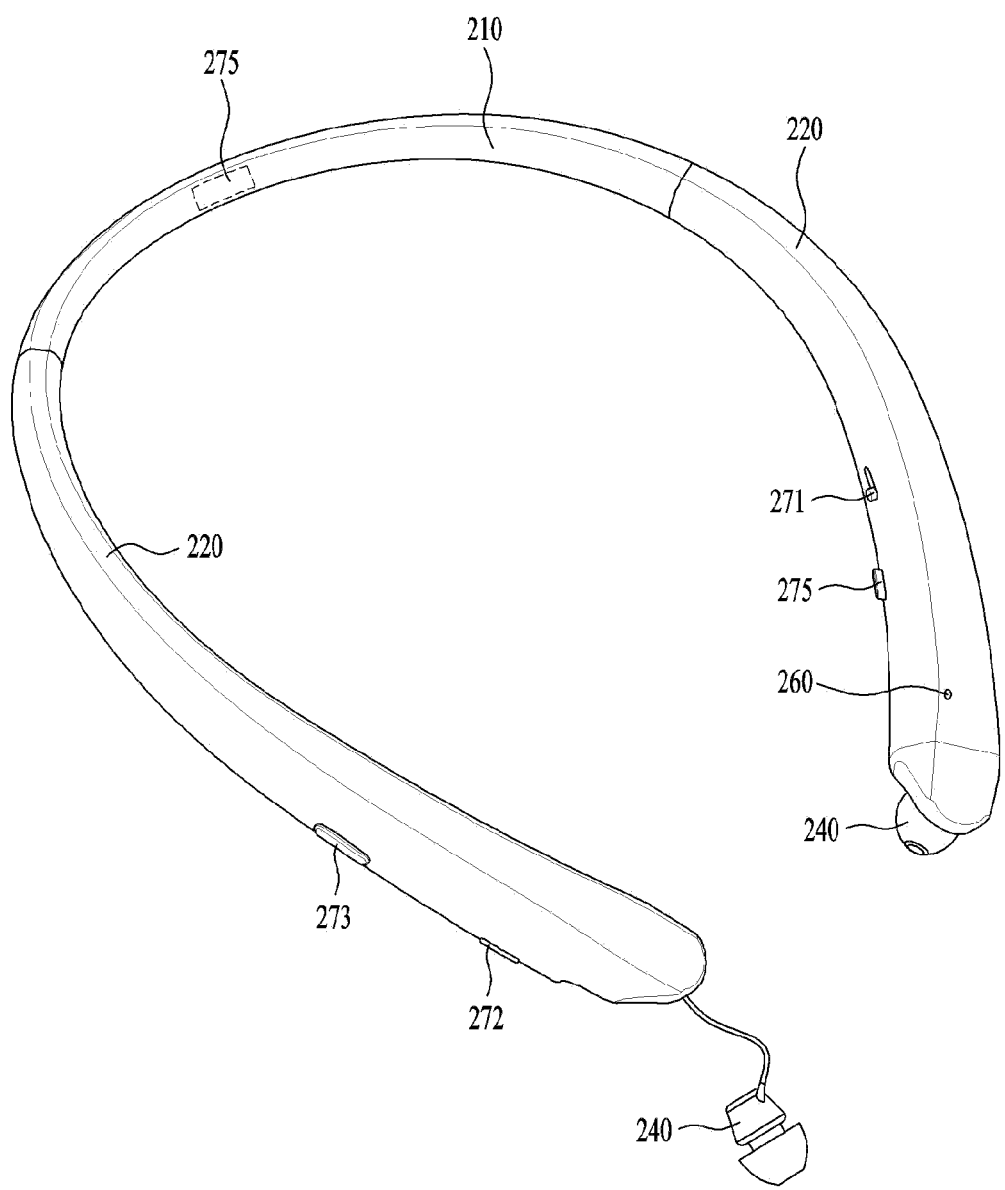
FIG. 2 is a perspective diagram of a portable sound equipment according to one embodiment of the present invention.
Figure 3:
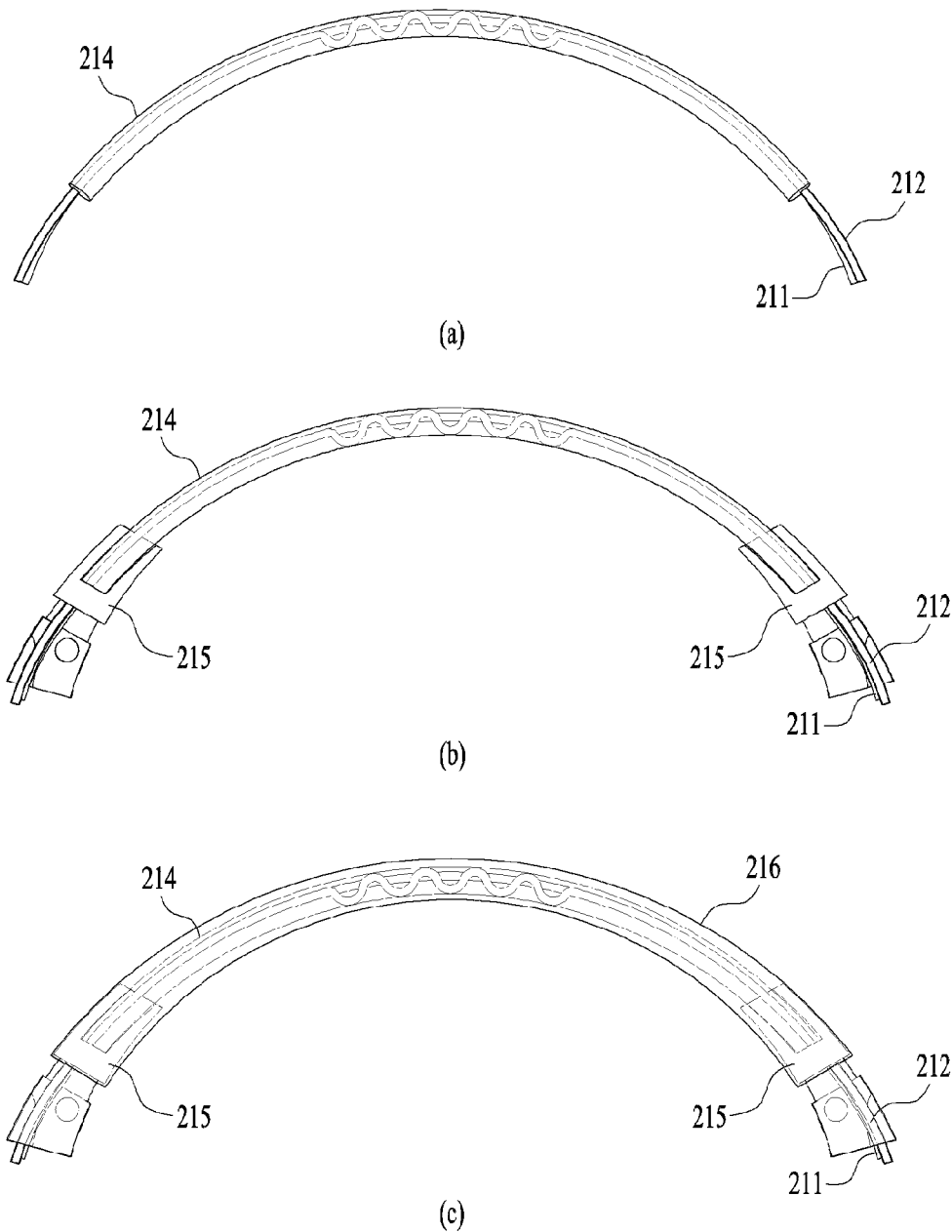
FIG. 3 is a diagram for a process for manufacturing an elastic band of a portable sound equipment according to one embodiment of the present invention.

According to the related art, only a call related function or a sound media play related function has been controllable through a portable sound equipment. Yet, the portable sound equipment according to the present invention is characterized in expanding the control range of its own. FIG. 2 is a perspective diagram of a portable sound equipment 200 according to one embodiment of the present invention, viewed in one direction. FIG. 3 is a diagram to describe a state of wearing a portable sound equipment 200 according to one embodiment of the present invention. A body of the portable sound equipment 200 of the present invention is configured with an elastic band 210 and a housing 220 and forms a C-shaped curve shown in FIG. 2.

Since the elastic band 210 is a member in a curved bar shape with elasticity, if a force is applied thereto, the elastic band 210 is deformed in a prescribed range. If the force is removed, the elastic band 210 returns to its previous shape. The housing 220 is coupled with both ends of the elastic band 210 and located at both end portions of the C-shaped curve of the portable sound equipment 200. Various parts such as a main board 281, the wireless communication unit 285, a battery 291, a winding member 250 and the line are inserted inside or outside.

Figure 4:
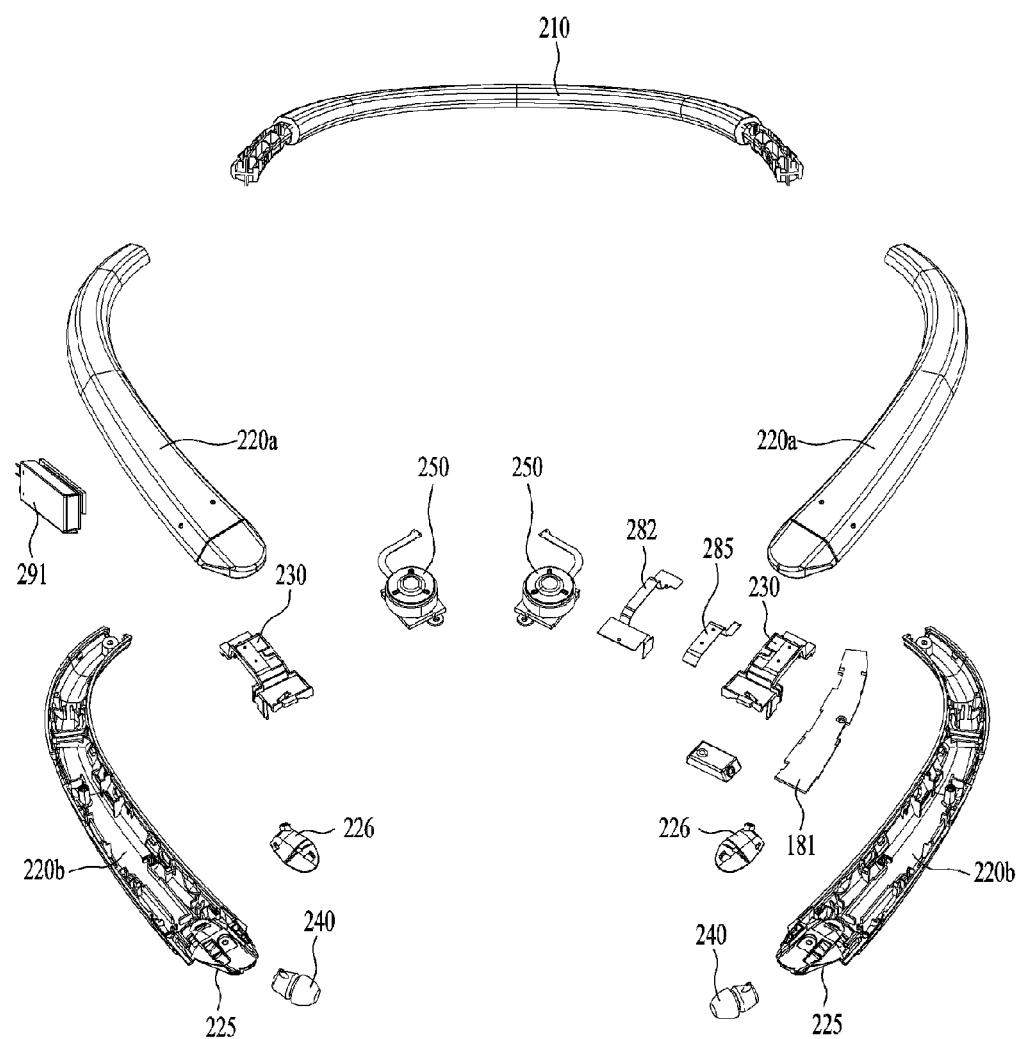
FIG. 4 is an exploded perspective diagram of a portable sound equipment according to one embodiment of the present invention.

The portable sound equipment 200 in the C-shape can be carried by being worn on user's neck, as shown in FIG. 3. Since the sensor 275 is provided to the elastic band 210, it is able to sense whether a user wears the portable sound equipment 200. For instance, when a user wears the portable sound equipment 200 provided with a displacement sensor for sensing curvature variation, as shown in FIG. 4, it is able to sense that both end portions of the portable sound equipment 200 are spread. In this case, since the curvature of the elastic band 210 changes smoothly, it is able to determine that the user intends to use the portable sound equipment 200. Hence, the power of the portable sound equipment 200 is turned on or the portable sound equipment 200 can be synchronized with an external terminal.

In order to accurately determine whether the user currently wears the portable sound equipment 200 or whether the portable sound equipment 200 is spread while carried, it is also able to consider a curvature again after the curvature of the portable sound equipment 200 has changed considerably in the displacement sensor. After the curvature of the elastic band 210 has changed into a first size considerably, if the curvature is fixed to a second size smoother than a size in a state that the portable sound equipment 200 is mounted, it is able to determine that the portable sound equipment 200 is worn on user's neck.

Such a sensor as a temperature detection sensor, a photosensor, a heart rate sensor and/or the like can be provided to a wearing surface of the portable sound equipment 200 coming in contact with a user's neck as well as the displacement sensor. When a user wears the portable sound equipment 200, if a sensed temperature belongs to a human body temperature range, brightness is lowered, or a heart rate is sensed, it is determined that the portable sound equipment 200 is worn by the user. If so, the power of the portable sound equipment 200 can be turned on or the portable sound equipment 200 can be synchronized with an external terminal by activating the wireless communication unit 285.

Alternatively, a switch 278 configured to be pressed physically can be provided to the portable sound equipment 200. If a user wears the portable sound equipment 200, the switch is pressed to generate an ON signal. If the switch 278 is maintained in the ON state over prescribed time, the power of the portable sound equipment 200 can be turned on or the portable sound equipment 200 can be synchronized with an external terminal.

If a plurality of the sensors 277 and a plurality of the switches 278 are provided to the portable sound equipment 200, a plurality of values can be combined together in order to make an accurate decision on whether the portable sound equipment 200 is worn.

FIG. 3 is a diagram for a process for manufacturing an elastic band 210 of a portable sound equipment 200 according to one embodiment of the present invention. Referring to FIG. 3(a), a memory alloy wire 211 and a signal line 212 are inserted in a polymer tube 214 in pipe shape with elasticity. The memory alloy wire 211 has a basic shape curved at curvature for the elastic band 210 to maintain the shape shown in FIG. 2 and provides elasticity for returning to an original shape despite receiving a force applied thereto. The signal line 212 transceives signals between the parts loaded in the left housing 220 and the parts loaded in the right housing 220. The polymer tube 214 holds the signal line 212 and the memory alloy wire 211 not to be spaced apart from each other and is also used to fix a coupling bracket 215 thereto.

Subsequently, referring to FIG. 3(b), both ends of the polymer tube 214 are fitted into the coupling brackets 215, respectively. The coupling bracket 215 is used to couple the housing 220 and the elastic band 210 together and may use a hard plastic material. The coupling bracket 215 may have a coupling hole/projection to be coupled with the housing 220, and the memory alloy wire 211 and the signal line 212 are exposed by penetrating the coupling bracket 215.

Referring to FIG. 3(c), a band cover 216 is formed by insert injection molding performed in a manner of putting the member shown in FIG. 3(b) into a mold and inserting plastic for covering the polymer tube 214 and the coupling brackets 215 in part. Once the band cover 216 is formed by the insert injection molding, the memory alloy wire 211, the signal line 212 and the coupling brackets 215 are integrally formed. Hence, although the shape of the elastic band 210 is repeatedly changed, the elastic band 210 avoids losing elasticity of its own, has enhanced durability, and is provided with waterproof functionality to prevent sweat from infiltrating on contacting with user's body.

The band cover 216 may use thermoplastic polyurethane. In fabricating the band cover 216, thermoplastic polyurethane is melted by heat. If thermoplastic polyurethane is hardened, it becomes an elastic material similar to rubber or the like with oil resistance and wear resistance. The larger an overlapping section between the coupling bracket 215 and the band cover 216 becomes, the greater the rigidity of the elastic band 210 gets. Hence, it is difficult to deform the elastic band 210.

FIG. 4 is an exploded perspective diagram of the portable sound equipment 200 according to one embodiment of the present invention.

The housing 220 coupled with both end portions of the elastic band 210 mentioned in the foregoing description includes an upper housing 220a and a lower housing 220b. The main board 281, the wireless communication unit 285, the battery 291, the microphone 260, the rotation module 250 and the like are loaded between the upper housing 220a and the lower housing 220b.

The housing 220 is formed by injection molding with polymer material and may use such plastic product with rigidity as polystyrene. The housing 220 may include such different material as metal, glass, leather and/or the like in part. The material of the housing 220 may use the same material of the coupling bracket 215 and differ from that of the band cover 216.

Since TPU (thermoplastic polyurethane) used for the band cover 216 has elasticity, it is easily deformed. If an applied force is removed, TPU can return to its previous shape. Since TPU has a high frictional coefficient of a surface, it can closely adhere to user's body.

The housing 220 is formed with polystyrene (PS) material having rigidity to protect inner parts. And, a surface of the housing 220 can be coated with polyurethane to adhere closely to user's body. If the surface of the housing 220 is coated with polyurethane, the portable sound equipment 200 can have an exterior with sense of unity. Moreover, since both the elastic band 210 and the housing 220 adhere closely to user's skin to be stabilized against user's motion, the portable sound equipment 200 can provide good fit.

As the portable sound equipment 200 worn on user's body is frequently exposed to water or moisture such as sweat or the like, it is able to enhance durability of the portable sound equipment 200 to which waterproof function is added. If a rib configured to cover a gap between the upper housing 220a and the lower housing 220b is provided or a waterproof member is inserted between the upper and lower housings 220a and 220b, it is able to prevent water from infiltrating. Although a separate waterproof member is not inserted, if polyurethane coating is applied, the upper and lower housings 220a and 220b can adhere to each other more closely.

The wireless communication unit 285, the microphone 260 and the like are mounted on the main board 281 installed inside the housing 220. And, the main board 281 is connected to the battery 291, the user input unit 270, the audio output unit 240 and the like. Parts installed in the housing 220 may be symmetrically provided to the housings 220 on both sides. Alternatively, only the parts provided on one side may be used through the signal line 212 installed in the elastic band 210. For instance, in case that the wireless communication unit 285 is provided to the housing 220 on one side, a sound signal received by the wireless communication unit 285 can be outputted through the earbuds 240 on both sides.

The wireless communication unit 285 can transceive signals with an external terminal by being mounted on the main board 281 or formed on the surface of the housing 220. The wireless communication unit 285 receives control signals and sound signals from an external terminal or transmits control signals and sound signals inputted through the user input unit 270 or the microphone 260 of the portable sound equipment 200 to the external terminal, using such short range wireless communication with the external terminal as Bluetooth or the like.

A power button 271 for turning ON/OFF a power, a button 272 for play or call, a direction key 273 for adjusting sound and the like can be included in the housing 220. In particular, the direction key may be used to control a song previous or next to a played song to be played. The button may use a dome key configured to be pressurized physically or a touch key sensed through static capacitance variation.

In case of the touch key, the surface of the housing 220 can be variously used for the location of the touch key without limitation. When the touch key is formed on the surface of the housing 220, a touch key location and function can be displayed on the touch key formed portion of the surface of the housing 220 using LED. The earbud 240 delivers sound by being inserted in user's ear and is connected to the main board 281 through the sound cable 245. The main board 281 controls the earbud 240 to output sound according to sound signal.

Figure 5:
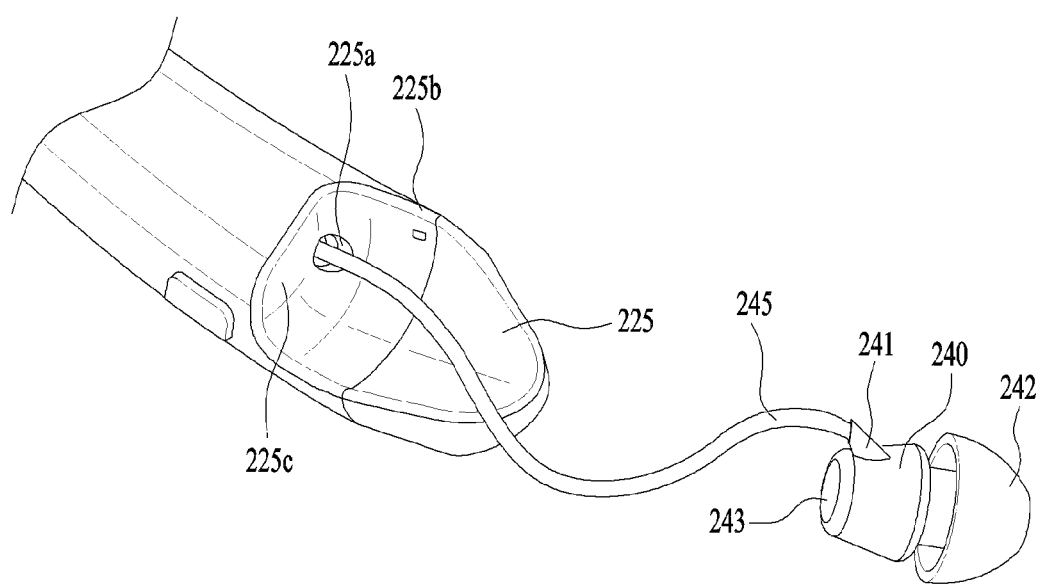
FIG. 5 is a diagram of an earbud and an earbud holder of the present invention.

FIG. 5 is a diagram of an earbud 240 and an earbud holder 225 of the present invention. FIG. 6 and FIG. 7 are diagrams to describe a manner of coupling the earbud 240 with the earbud holder 225 of the present invention.

The housing 220 of the present invention is provided with the earbud holders 225, at which the earbuds 240 are seated, on both sides, respectively. The earbud holder 225 can be formed at one end portion of the lower housing 220b. In particular, the earbud holder 225 can be prevented from being externally exposed when a user wears the portable sound equipment 200.

The earbud holder 225 includes a recess configured to be concavely recessed to match a shape of the earbud 240. And, the sound cable 245 configured to connect the earbud 240 and the main board 281 passes through a cable hole 225a formed in the earbud holder 225.

As the sound cable 245 is wound on a circumference of the rotation module 250 by elasticity of the rotation member installed in the housing 220, the earbud 240 can be automatically coupled with the earbud holder 225.

Since the related art earbud frequently causes a problem of failing to be accurately coupled with the earbud holder 225 (e.g., a problem of coupling with the earbud holder 225 askew or inverted), it is inconvenient for a user to fix the earbud 240 to be correctly coupled. The present invention improves the design of the earbud 240 and the earbud holder 225 to enable the earbud 240 to be coupled with a correct position of the earbud holder 225.

According to the related art, the earbud holder 225 has a streamlined shape in general. Although the earbud 240 is coupled inverted or askew, it is stored in a wrong position to correspond to the streamlined shape. Yet, the earbud holder 225 of the present invention includes a flat or horizontal portion 225c formed on a portion contacting with a direction opposite to a direction of outputting sound of the earbud 240.

To correspond to the horizontal portion 225c of the earbud holder 225, the earbud 240 includes a flat or horizontal portion 243. Hence, the earbud 240 is stored in the earbud holder 225 in a manner that the horizontal portion 243 of the earbud 240 comes into contact with the horizontal portion 225c of the earbud holder 225.

The cable hole 225a through which the sound cable 245 passes is located on one side of the horizontal portion 225c of the earbud holder 225. If the cable hole 225a is situated at the center of the horizontal portion 225c, it is possible that the earbud 240 may be coupled inverted or askew. Hence, the cable hole 225a is disposed in a manner of leaning to one side of the horizontal portion 225c and the sound cable 245 is coupled at a location leaning to one side of the horizontal portion 243 instead of the center of the horizontal portion 243 of the earbud 240.

The cable holder 241 at which the earbud 240 and the sound cable 245 is configured to be projected from the earbud 240. The cable holder 241 includes such an elastic member as rubber and prevents the sound cable 245 to be cut by being bent. The cable holder 241 is inserted in the cable hole 225a of the earbud holder 225.

Referring to FIG. 6, a first angle α between the horizontal portion 225c of the earbud holder 225 and the cable hole 225a can be formed to correspond to a second angle β between the horizontal portion 243 of the earbud 240 and the cable holder 241. If the first angle α is equal to the second angle β, when the cable holder 241 is inserted in the cable hole 225a, the earbud 240 can be coupled in an accurate place.

Only if an angle between a normal line of the horizontal portion 225c and the cable hole 225 is smaller than 45°, it is able to prevent the sound cable 245 from causing friction on passing through the cable hole 225. Hence, it is preferable that each of the first angle α and the second angle β is formed greater than 45°.

FIG. 7 is a front diagram of the earbud holder 225. A sidewall portion 225b of the earbud holder 225 enclosing a circumference of the earbud 240 includes a curved surface having a curvature corresponding to a circumferential curvature of the earbud 240. A third angle θ formed between the sidewall portion 225b of the earbud holder 225 and the cable hole 225a corresponds to a fourth angle ω formed between a lateral circumference of the earbud 240 and a cable holder 241. If each of the third angle θ and the fourth angle ω is greater than 90°, a function of guiding the earbud 240 to be situated at a regular or correct position is degraded. If such angle is set smaller than 45°, the sidewall portion 225b becomes an obstacle when the earbud 240 is coupled with the earbud holder 225. Hence, it is able to design the shapes of the earbud 240 and the earbud holder 225 to have an intermediate angle (e.g., about 70°) between 45° and 90°.

Since the sidewall portion 225 extends long from the horizontal portion 225c in an end portion direction of the body, the earbud 240 is stored along the sidewall portion 225. Hence, it is able to solve the related art problem that an ear cap 242 of the earbud 240 is stored toward a side.

The ear cap 242 formed of silicon or polyurethane material is detachably provided to be inserted in user's ear by adhering closely thereto. When a user is changed, the ear cap 242 is replaceable in size fit for the changed user. After the ear cap 242 has been used for long time, if the ear cap 242 gets dirty, it can be replaced by a new one for the benefit of hygiene.

If a magnetic substance 226 such as magnet/metal is provided to the earbud 240 and the earbud holder 225, when the earbud 240 approaches the earbud holder 225, the earbud 240 can be automatically inserted in the earbud holder 225 by magnetism. A sensor of the earbud 240 can be further included in the earbud holder 225 to sense whether the earbud 240 is seated on the earbud holder 225. Through the sensor of the earbud 240, a user can control the portable sound equipment 200 depending on whether the earbud 240 is separated from the earbud holder 225.

For instance, if the earbud 240 on one side is separated from the earbud holder 225, synchronization with an external terminal can be performed by activating a call function of a mobile terminal or the wireless communication unit 285. If both of the earbuds 240 are separated from the earbud holders 225, it is able to activate a function related to sound of an external terminal. If the earbud 240 is stored in the earbud holder 225, a currently played song is stopped or the synchronization can be ended.

As the portable sound equipment 200 is worn on user's neck, it has difficulty in providing visual information. Hence, the portable sound equipment 200 can provide alarm to a user through the sound output unit 240 and a vibration motor. If a power is turned on, synchronization with an external terminal is achieved, or a notification item such as a call signal reception or a message reception occurs, such an event can be notified to a user by providing vibration or notification sound.

The battery 291 may be loaded in both sides of the housing 220. Alternatively, the battery 291 may be loaded in one side of the housing only. And, a charging terminal for charging the battery 291 may be included.

When the earbud 240 is stored in the earbud holder 225, the sound cable 245 is stored in the housing 220 in a manner of being wound by the rotation module 250 located in the housing 220. Hence, the sound cable 245 is not externally exposed from the portable sound equipment 200. The rotation module 250 includes a fixed shaft fixed to the housing 220, a wheel configured to rotate centering on the fixed shaft, a plate spring configured to provide a rotating force to the wheel, and the like. In this case, the sound cable 245 is wound on an outer surface of the wheel.

The plate spring provides the rotating force to enable to rotation module 250 to rotate in a first direction. If a user pulls the sound cable 245, the rotation module 250 is rotated in a second direction opposite to the first direction, whereby the sound cable 245 is unwound from the rotation module 250 to be externally exposed from the housing 220.

Figure 8:
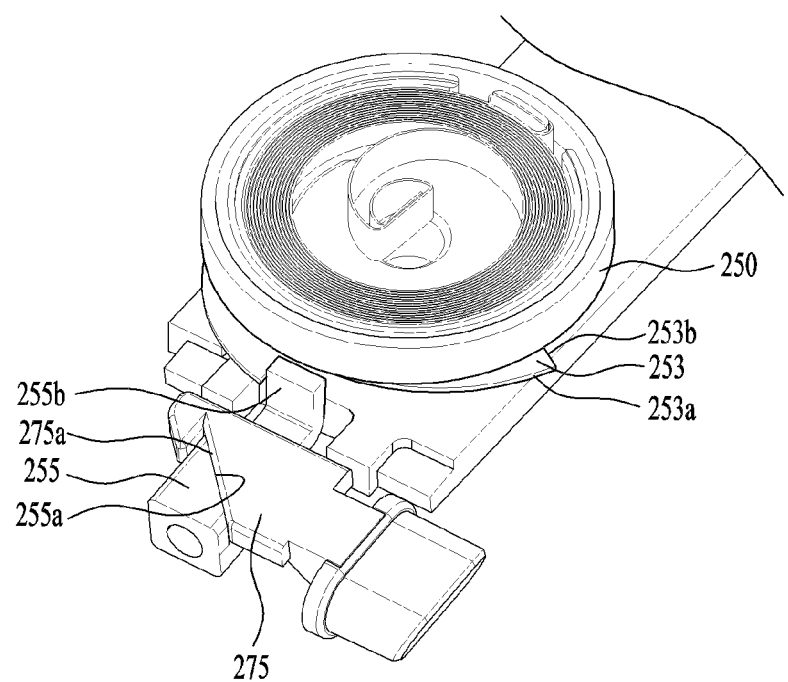
FIG. 8 is a diagram of a rotation module, a stopper and a storage button of the present invention.

FIG. 8 is a diagram of a rotation module 250, a stopper 255 and a storage button 275 of the present invention. In order to maintain a state that the earbud 240 can be used by a user by falling out of the earbud holder 225, a stopper 255 configured to prevent the rotation module 250 from rotating in the first direction can be further included. A projection 253 in saw-tooth shape is formed on an outer side of the rotation module 250. One side of the projection 253 is an incline 253a and a step 253b is formed on the other side of the projection 253.

When the rotation module 250 rotates in the first direction, since the step 253b of the projection 253 comes into contact with the stopper 255, the rotation module 250 is unable to rotate. When the rotation module 250 rotates in the second direction, the stopper 255 moves along the incline 253a of the projection 253 so as not to interrupt the rotation of the rotation module 250.

In particular, when the sound cable 245 is pulled by a user, the rotation module 250 rotates in the second direction. If the force of pulling the sound cable 245 is removed, the stopper 255 is caught on the step 253b to interrupt the rotation module 250 not to rotate in the first direction.

Since friction repeatedly is generated from a portion 255b of the stopper at which the stopper 255 and the projection 253 come into contact with each other, it is able to use such a member as SUS (steel use stainless) having durability greater than that of synthetic resin such as polycarbonate (PC).

The stopper 255 moves in a diameter direction of the rotation module 250 and the storage button 275 for controlling the movement of the stopper 255 is externally exposed. The storage button 275 is disposed in a direction vertical to that of the stopper 255. As an inline is formed in a place at which the stopper and the storage button 275 come into contact with each other, it can deliver a force of the storage button 275 to the stopper 255.

If the storage button 275 is pressed in the first direction, the incline 275a of the storage button 275 is moved along the inline 255a formed in the stopper 255 and the stopper 255 is pushed in the second direction. Once the stopper 255 is moved in the second direction, it moves away from the rotation module 250, such that the rotation module 250 is rotated in the first direction by the plate spring of the rotation module 250, and the sound cable 245 is stored by being wound on the rotation module 250.

Figure 9:
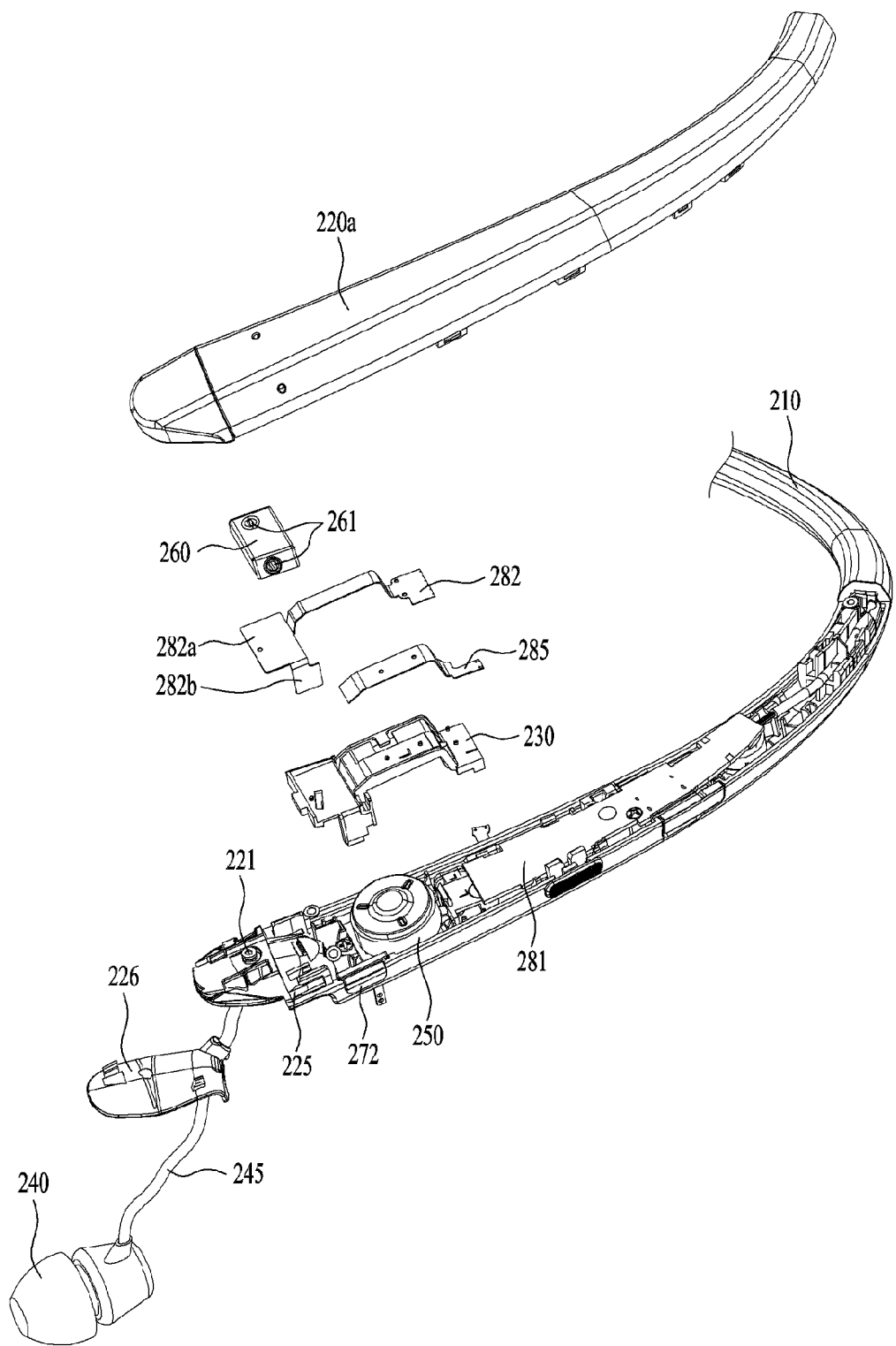
FIG. 9 is an exploded perspective diagram of a housing inside in a portable sound equipment according to one embodiment of the present invention.
Figure 10:
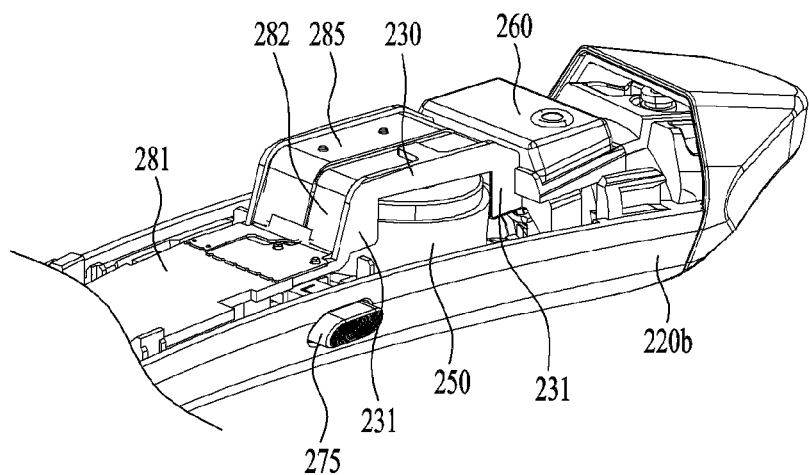
FIG. 10 is an enlarged perspective diagram to describe disposition of a bridge, a flexible board and a rotation module of the present invention.

FIG. 9 is an exploded perspective diagram of an inner configuration of a housing 220 in a portable sound equipment 200 according to one embodiment of the present invention. FIG. 10 is an enlarged perspective diagram to describe disposition of a bridge 230, a flexible board 282 and a rotation module of the present invention.

A main board 281, a rotation module 250, a bridge 230, a flexible board 282, a microphone 260 and an antenna module 285 are installed in the housing 220. Referring to FIG. 4, a battery 291 is installed in the opposite housing 220 instead of the main board 281. And, an auxiliary board for delivering a signal of a user input unit 270 and a sound signal to an earbud 240 and a rotation module are installed.

A sound cable 245 is wound on an outer circumference of the rotation module 250. And, the rotation module 250 rotates in the first direction and the second direction repeatedly. It may cause a problem that the rotation module 250 affects peripheral devices while rotating. And, it may cause a problem that the sound cable 245 is bumped against peripheral devices while wound on the rotation module 250. Moreover, since the rotation module 250 is connected to the sound cable 245, it is disposed adjacent to the earbud holder 225, whereby the main board 281 leans toward an elastic band [FIG. 9].

As the main board 281 is disposed on a rear side, the microphone 260 or the user input unit 270 (e.g., button) is located on a side leaning to the elastic band 210. In case that the microphone 260 or the button is disposed not on the end portion of the body but on the side of the elastic band 210, since the button or the sound output unit is located not on the front side but in a lateral direction, it is inconvenient to use the microphone 260 or the button.

Therefore, the present invention additionally includes a bridge 236 configured to cover the rotation module 250, thereby minimizing the influence on peripheral parts due to the rotation of the rotation module 250.

The bridge 230, as shown in FIG. 9, is bent to form a space in a lower part, and the rotation module 250 is disposed in the space. As both end portions of the bridge 230 are fixed to the lower hosing 220b, the rotation module 250 is located under the bridge and electronic parts such as the flexible board and the like can be mounted above the bridge 230.

In order to place the microphone 260 and the button in an end portion of the body, a flexible board 282 connected to the main board 281 is required. The flexible board 282, as shown in FIG. 10, is located on an upper surface of the bridge. One end is connected to the main board 281, and the other end is connected to the microphone 260.

The microphone 260 of the present invention can collect voice by receiving sound through each of two holes 261. In this case, the voice is collected in a manner of being uniform irrespective of location of user's face and minimizing ambient noise. The microphone 260 can recognize user's voice more accurately if getting closer to user's mouth. Hence, it is preferable that the microphone 260 is located at an end portion of the body. In particular, when a user wears the portable sound equipment, the microphone 260 is preferably located in a front direction. Therefore, according to the present invention, the microphone 260 is disposed in a direction of the end portion of the body so as to confront the earbud holder 225 adjacently.

The flexible board 282 delivers a signal of the user input unit 270 located at the end portion of the body to the main board 281 as well as a signal of the microphone 260. When a user wears the portable sound equipment, if the user input unit 270 is located in front of the user, it is convenient for the user to use the user input unit 270. Hence, the button can be situated at the end portion of the body using the flexible board 282.

Thus, as the microphone 260 disposed at a location adjacent to user's mouth can catch user's voice accurately, the user can have a phone conversation with clear sound quality even in a heavy noise environment (e.g., commuting subway, etc.) as well as in a quiet environment (e.g., office, library, etc.).

An antenna module 285 can be disposed on an upper surface of the bridge 230. The antenna module 285 can be fabricated by forming a conductive pattern on a flexible insulating film. And, the antenna module 285 can transceive wireless signals by being connected to the main board 281.

The sound cable 245 connected to the rotation module 250 is connected to the earbud 240 by passing through the cable hole 225a formed in the earbud holder 225. In case that the cable hole 225a is directly formed in the lower housing 220b, a cable needs to be cut. Instead, after a slit 221 has been formed in the earbud holder 225 of the lower housing 220b, the sound cable 245 is set to pass through the slit 221.

One end portion of the slit 221 is open, while the other closed end portion is disposed at a location corresponding to that of the cable hole 225a. The earbud holder 225 can be covered with a holder cap 226 so as to hide the slit 221. As the above-configured slit 221 is formed, the rotation module 250, the sound cable 245 and the earbud 240 can be easily separated. Therefore, maintenance is facilitated.

Figure 11:
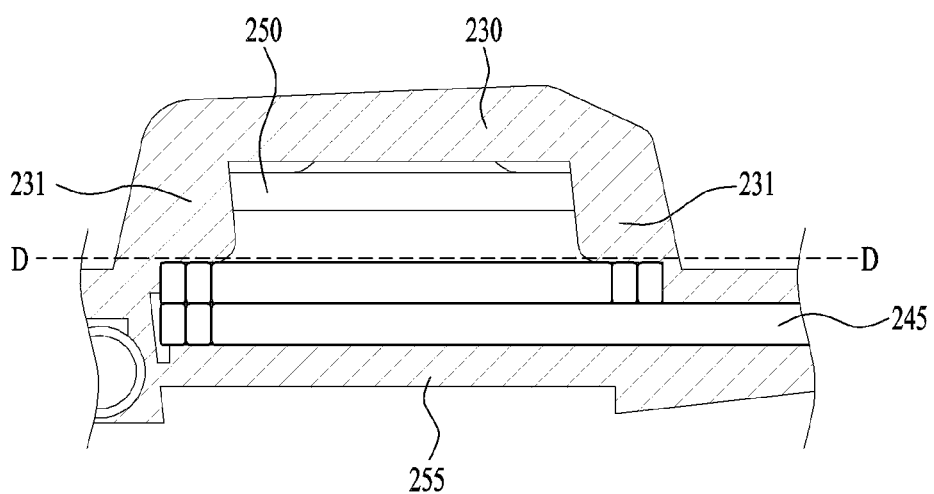
FIG. 11 is a lateral-view diagram of a bridge and a rotation member of the present invention.

FIG. 11 is a lateral-view diagram of a bridge and a rotation member of the present invention.

A lower side of the bridge 230 covers the rotation module 250 by forming a space in trapezoid shape. In this case, it is able to form a cable guide 231 configured to enable the sound cable 245 to be evenly wound on an outer surface of the rotation module 250 by being projected in a predetermined distance from an outer circumference of the rotation module 250 in part.

If the sound cable 245 is wound to overlap, the sound cable 245 is entangled within the housing 220. Hence, the rotation module 250 stops and the sound cable 245 is unable to come out of the housing 220. In order to solve such a problem, it is able to form the cable guide 231 projected from the bridge 230 toward the rotation module 250.

The cable guide is projected from a lower portion of the bridge 230 to be located adjacent to a circumference of the rotation module 250. As the cable guide 231 is spaced apart from a bottom surface 255 having the rotation module 250 seated thereon, a space is formed between the seated bottom surface 255 and the cable guide 231.

In particular, the cable guide 231 is located near an upper part of the rotation module 250 and there is a gap between the rotation module 250 and the cable guide 231. Yet, since such a gap is smaller than thickness of the sound cable, the sound cable 245 cannot be wound on an upper part of the rotation module 250. In particular, since the sound cable 245 is wound on a portion below D only, as shown in FIG. 11, the sound cable 245 is piled up neatly in an outer direction from a center of the rotation module so as to prevent the sound cable 245 from being entangled.

The sound cable 245 is wound in the space between the bottom surface 255 and the cable guide 231. In order to prevent the sound cable 245 from being entangled, the cable guide 231 is disposed by being spaced apart from the bottom surface 255 in a distance enough for 1 to 3 sound cables 245 to be located therein.

Since at least one or more cable guides 231 can be disposed, if too many cable guides are disposed, a frictional force is generated to restrict a turning force of the rotation module 250 and damage the sound cable 245. Hence, it is necessary to adjust the number of the cable guides. The present embodiment proposes to dispose around four cable guides.

Figure 12:
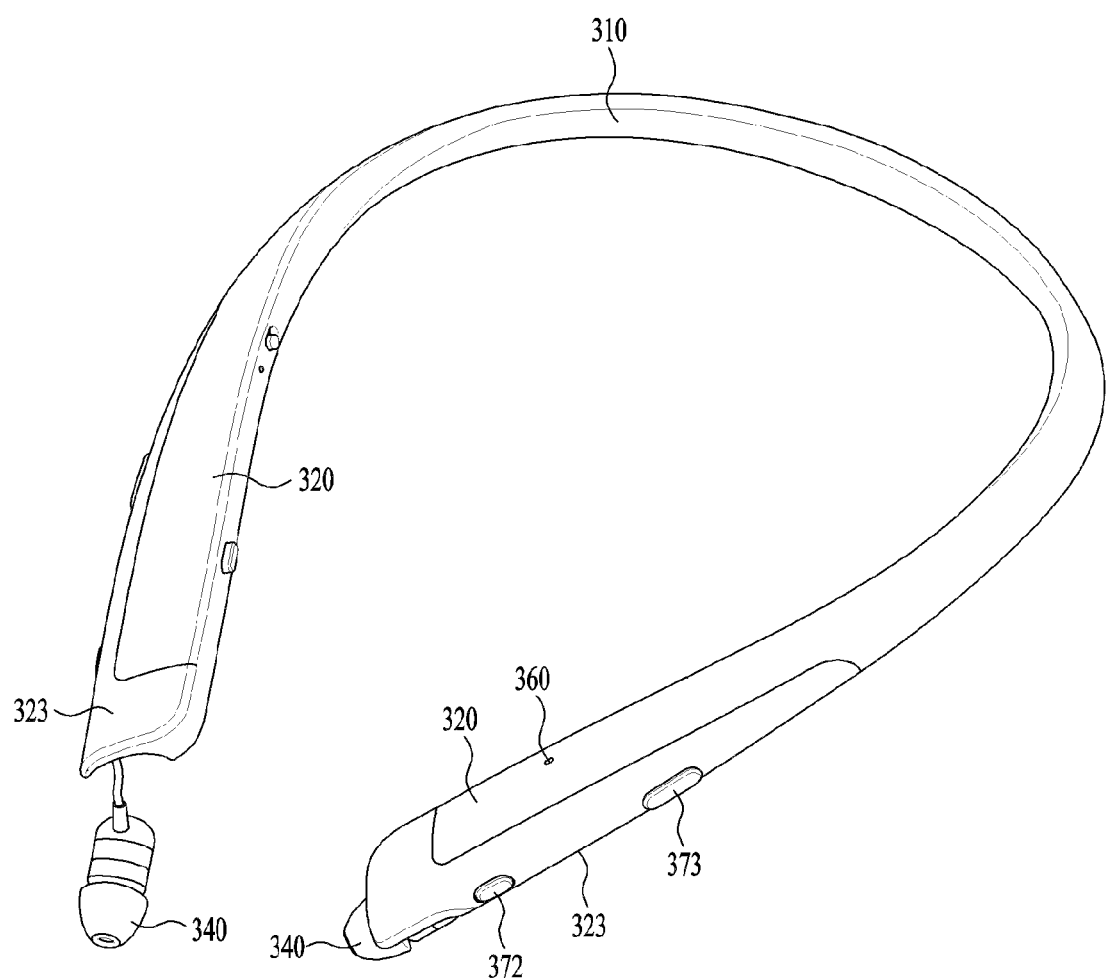
FIG. 12 is a perspective diagram of a portable sound equipment according to another embodiment of the present invention.
Figure 13:
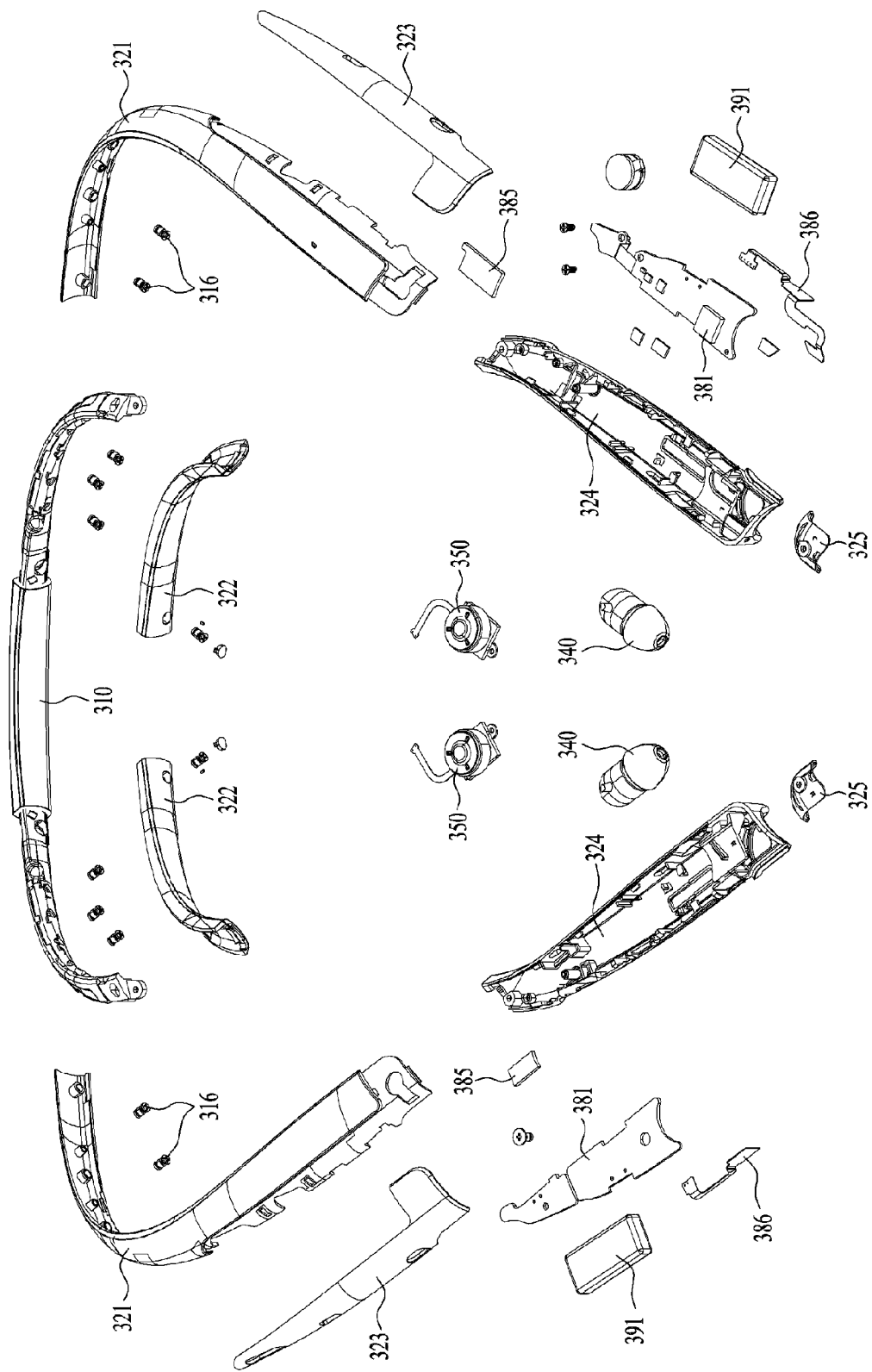
FIG. 13 is an exploded perspective diagram of a portable sound equipment according to another embodiment of the present invention.

FIG. 12 is a perspective diagram of a portable sound equipment 300 according to another embodiment of the present invention, viewed in one direction. FIG. 13 shows a state that a portable sound equipment 300 according to another embodiment of the present invention is worn. A body of a portable sound equipment 300 according to the present invention includes an elastic band 310 and a housing 320, thereby forming a C-shaped curve shown in FIG. 12.

The elastic band 310 has a tape shape with faces and thickness. When the elastic band is placed on a backside of a neck, an inner side of the elastic band touches the backside of the neck and an outer side faces the backside. As a portion connecting the elastic band and the housing is twined, the housing located on both end portions of the body has an outer side facing a front direction and an inner side touching user's collar bone.

Since the elastic band 310 has elasticity, if a force is applied, the elastic band 310 is deformed within a prescribed range. If the force is removed, the elastic band 310 returns to its previous shape. The housing 320 is coupled with both ends of the elastic band 310 and located at both end portions of the C-shaped curve of the portable sound equipment 300. Various parts such as a main board 381, a wireless communication unit 385, a battery 391, a rotation module 350 and the like are inserted in the housing 320.

The C-shaped portable sound equipment 300, as shown in FIG. 13, can be carried by being worn on user's neck. If a sensor 375 is provided to the elastic band 310, it is able to sense whether a user wears the portable sound equipment 300. For instance, when a user wears the portable sound equipment 300 provided with a displacement sensor for sensing curvature variation, it is able to sense that both end portions of the portable sound equipment 300 are spread. In this case, since the curvature of the elastic band 310 changes smoothly, it is able to determine that the user intends to use the portable sound equipment 300. Hence, the power of the portable sound equipment 300 is turned on or the portable sound equipment 300 can be synchronized with an external terminal.

In order to accurately determine whether the user currently wears the portable sound equipment 300 or whether the portable sound equipment 300 is spread while carried, it is also able to consider a curvature again after the curvature of the portable sound equipment 300 has changed considerably in the displacement sensor. After the curvature of the elastic band 310 has changed into a first size considerably, if the curvature is fixed to a second size smoother than a size in a state that the portable sound equipment 300 is mounted, it is able to determine that the portable sound equipment 300 is worn on user's neck.

Such a sensor as a temperature detection sensor, a photosensor, a heart rate sensor and/or the like can be provided to a wearing surface of the portable sound equipment 300 coming in contact with a user's neck as well as the displacement sensor. When a user wears the portable sound equipment 300, if a sensed temperature belongs to a human body temperature range, brightness is lowered, or a heart rate is sensed, it is determined that the portable sound equipment 300 is worn by the user. If so, the power of the portable sound equipment 300 can be turned on or the portable sound equipment 300 can be synchronized with an external terminal by activating the wireless communication unit 385.

Alternatively, a switch 378 configured to be pressed physically can be provided to the portable sound equipment 300. If a user wears the portable sound equipment 300, the switch is pressed to generate an ON signal. If the switch 378 is maintained in the ON state over prescribed time, the power of the portable sound equipment 300 can be turned on or the portable sound equipment 300 can be synchronized with an external terminal.

If a plurality of the sensors 377 and a plurality of the switches 378 are provided to the portable sound equipment 300, a plurality of values can be combined together in order to make an accurate decision on whether the portable sound equipment 300 is worn.

FIG. 13 is an exploded perspective diagram of the portable sound equipment 300 according to another embodiment of the present invention.

The housing 320 coupled with both end portions of the elastic band 310 mentioned in the foregoing description includes an upper case 321 and a lower case 324. The main board 381, the wireless communication unit 385, the battery 391, the microphone 360, the rotation module 350 and the like are loaded between the upper case 321 and the lower case 324.

The housing 320 is formed by injection molding with polymer material and may use such plastic product with rigidity as polystyrene. The housing 320 may include such different material as metal, glass, leather and/or the like in part. The material of the housing 320 may use the same material of the coupling bracket 315 and differ from that of the band cover 316.

Since TPU (thermoplastic polyurethane) used for the band cover 316 has elasticity, it is easily deformed. If an applied force is removed, TPU can return to its previous shape. Since TPU has a high frictional coefficient of a surface, it can closely adhere to user's body.

The housing 320 is formed with polystyrene (PS) material having rigidity to protect inner parts. And, a surface of the housing 320 can be coated with polyurethane to adhere closely to user's body. If the surface of the housing 320 is coated with polyurethane, the portable sound equipment 300 can have an exterior with sense of unity. Moreover, since both the elastic band 310 and the housing 320 adhere closely to user's skin to be stabilized against user's motion, the portable sound equipment 300 can provide good fit.

As the portable sound equipment 300 worn on user's body is frequently exposed to water or moisture such as sweat or the like, it is able to enhance durability of the portable sound equipment 300 to which waterproof function is added. If a rib configured to cover a gap between the upper case 321 and the lower case 324 is provided or a waterproof member is inserted between the upper and lower cases housings 321 and 324, it is able to prevent water from infiltrating. Although a separate waterproof member is not inserted, if polyurethane coating is applied, the upper and lower cases 321 and 324 can adhere to each other more closely.

The wireless communication unit 385, the microphone 360 and the like are mounted on the main board 381 installed inside the housing 320 of the present invention. And, the main board 381 is connected to the battery 391, the user input unit 370, the audio output unit 340 and the like. Parts installed in the housing 320 may be symmetrically provided to the housings 320 on both sides. Alternatively, only the parts provided on one side may be used through the signal line 312 installed in the elastic band 310. For instance, in case that the wireless communication unit 385 is provided to the housing 320 on one side, a sound signal received by the wireless communication unit 385 can be outputted through the earbuds 340 on both sides.

The wireless communication unit 385 can transceive signals with an external terminal by being mounted on the main board 381 or formed on the surface of the housing 320. The wireless communication unit 385 receives control signals and sound signals from an external terminal or transmits control signals and sound signals inputted through the user input unit 370 or the microphone 360 of the portable sound equipment 300 to the external terminal, using such short range wireless communication with the external terminal as Bluetooth or the like.

A power button 371 for turning ON/OFF a power, a button 372 for play or call, a direction key 373 for adjusting sound and the like can be included in the housing 320. In particular, the direction key may be used to control a song previous or next to a played song to be played. The button may use a dome key configured to be pressurized physically or a touch key sensed through static capacitance variation.

In case of the touch key, the surface of the housing 320 can be variously used for the location of the touch key without limitation. When the touch key is formed on the surface of the housing 320, a touch key location and function can be displayed on the touch key formed portion of the surface of the housing 320 using LED. The earbud 340 delivers sound by being inserted in user's ear and is connected to the main board 381 through the sound cable 345. The main board 381 controls the earbud 340 to output sound according to sound signal.

Figure 14:
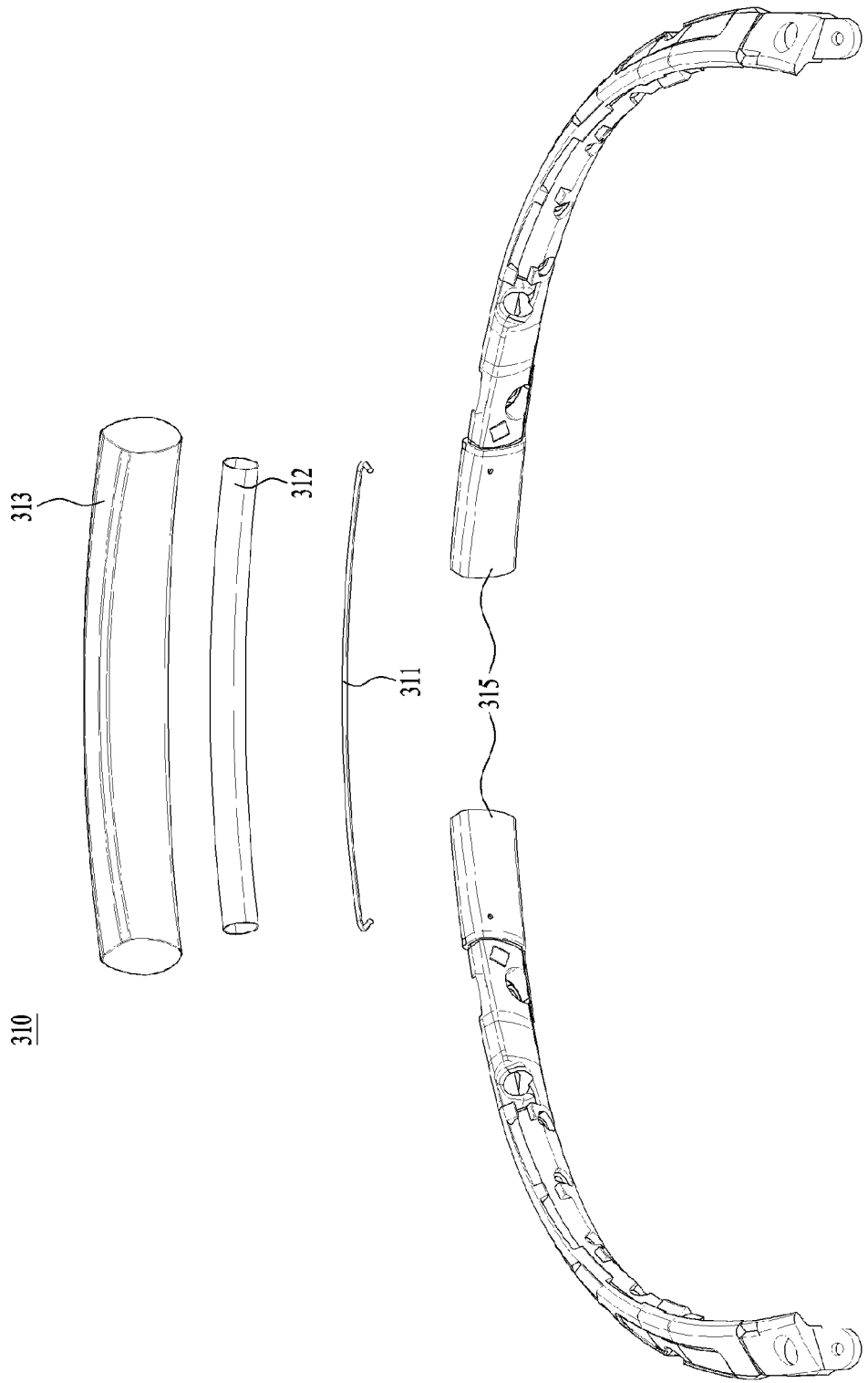
FIG. 14 is an exploded perspective diagram of an elastic band in a portable sound equipment according to another embodiment of the present invention.

FIG. 14 is an exploded perspective diagram of an elastic band 310 in a portable sound equipment 300 according to another embodiment of the present invention. The elastic band 310 includes a memory alloy 311, a covering member 312, 313, and a connecting part 315.

Memory alloy 311 has the property of restoring into a specific shape despite deformation. When a user applies a force to spread a body, although the elastic band 310 is deformed, memory alloy 311 has the property of returning to a previous shape, durability can be advantageously enhanced.

The elastic band 310 further includes the covering member 312, 313 configured to enclose the memory alloy 311.

The covering member 312, 313 can use thermoplastic polyurethane. Thermoplastic polyurethane is melted for fabrication by heat. If thermoplastic polyurethane is hardened, it becomes such an elastic material as rubber or the like with oil resistance and wear resistance.

Further included is a connecting part 315 having a coupling structure for being coupled with the housing 320 located at both ends of the elastic band 310. The connecting part 315 of the present invention is configured to extend in right and left directions from the covering part to overlap the housing 320, and coupled with the housing 320 by enclosing it in part. In particular, the covering part is formed on the memory alloy 311 and the connecting part 315 by double injection.

In order to accurately dispose a location of the memory alloy 311 at the connecting part 315 and fix the signal line 382 for transceiving signals of the housings 320 on both sides, a second covering part 312 can be further included to cover the memory alloy 311 and the signal line 382. Both end portions of the second covering part 312 are coupled with a pair of the connecting part 315s, respectively. Thereafter, by forming a first covering part 313 configured to cover the connecting part 315, the second covering part 312 and the memory alloy 311 by double injection, it is able to provide an elastic band 310 restorable into a previous shape after deformed easily on wearing.

Figure 15:
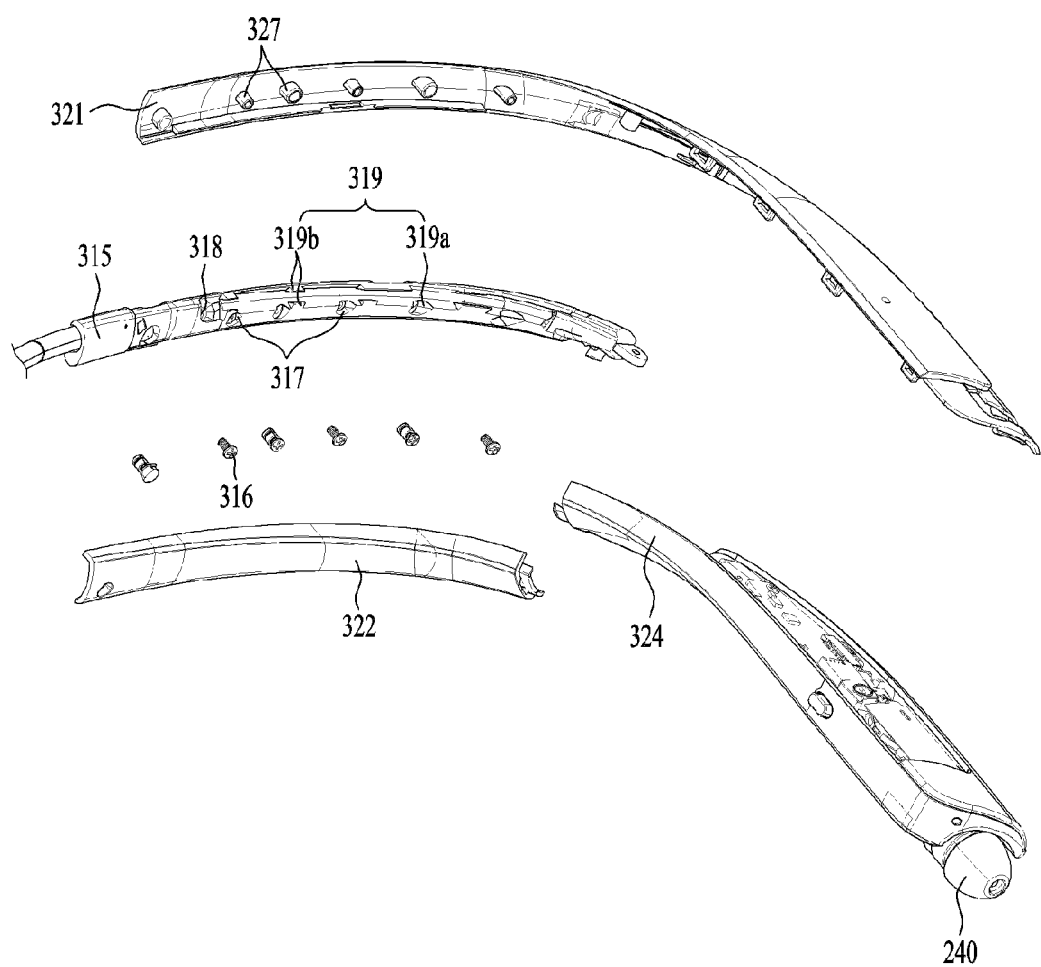
FIG. 15 is a diagram to describe a manner of coupling an elastic band and a housing in a portable sound equipment according to another embodiment of the present invention.

In order to raise a fixing force while exposing the memory alloy 311 from both ends of the second covering part, both end portions of the memory alloy 311 are bent in hook shape and then coupled with the connecting part 315. Since a plurality of holes is formed in the connecting part 315, the connecting part 315 is screwed to the housing 320. FIG. 15 is a diagram to describe a manner of coupling an elastic band 310 and a housing 320 in a portable sound equipment 300 according to another embodiment of the present invention.

A pair of housings 320 for enclosing both sides of a connecting part 315 is used. Since an upper case 321 is externally exposed, it can use one member connected from a portion coupled with the connecting part 315 of an elastic band 310 to both end portions of a body. And, a lower case 322, 324, as shown in FIG. 13, can include a first lower case 322 enclosing a connecting part 315 and a second lower case 324 having parts installed therein.

One of the upper case 321 and the lower case and the connecting part 315 are coupled together through a screw 316 tightened on the upper or lower case through a screw hole 317 formed in the connecting part 315 and an exposed head portion of the screw 316 is covered in a manner of being coupled with the housing on the opposite side.

According to a related art, since a locking force between the elastic band 310 and the housing 320 using a single screw 316 is weak, if a force is repeatedly applied to the elastic band 310, it may cause a problem of breakage. Yet, according to the present invention, the connecting part 315 is sufficiently extended to increase the locking force.

Figure 16A:
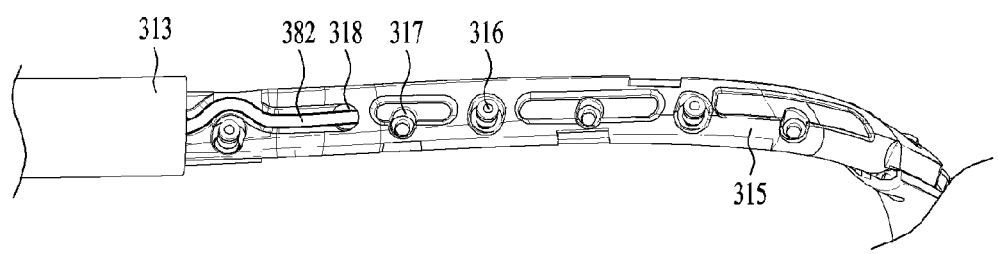
FIGS. 16A and 16B are diagrams to describe a manner of coupling a signal line and an elastic band in a portable sound equipment according to another embodiment of the present invention.
Figure 16B:
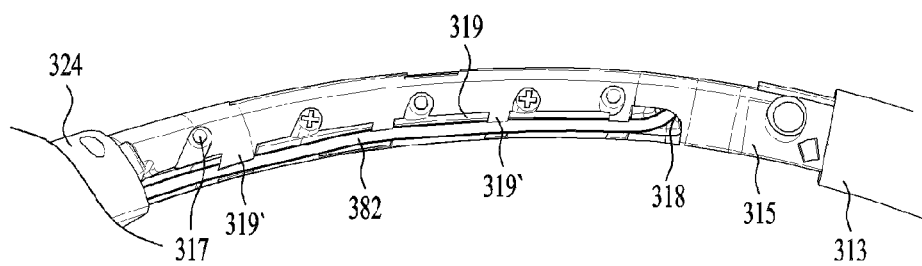

FIG. 16A is a front view to describe a manner of coupling the signal line 382 and the elastic band 310 in the portable sound equipment 300 according to another embodiment of the present invention. And FIG. 16B is a rear view to describe a manner of coupling the signal line 382 and the elastic band 310 in the portable sound equipment 300 according to another embodiment of the present invention. Both ends of the signal line 382 coupled with the elastic band 310 are connected to each housing 320 through the connecting part 315. If the signal line 382 is disposed in a manner of overlapping the hole, it may be damaged by the screw 316. Hence, a separate signal line receiving part 319 can be further included.

Since the signal line receiving part 319 alternately disposes a first portion 319a wider than the signal line 382 and a second portion 319b in size corresponding to thickness of the signal line 382, the signal line 382 can be easily fitted into the signal line receiving part 319 without falling out.

For rigidity of the connecting part 315, the signal line receiving part 319 is not disposed on one side only. Instead, one portion is situated in a direction of one side of the connecting part 315, another portion is situated in a direction of the other side of the connecting part 315, and the signal line receiving part 319 on one side and the other side can be connected through a signal line 382 hole.

Figure 17A:
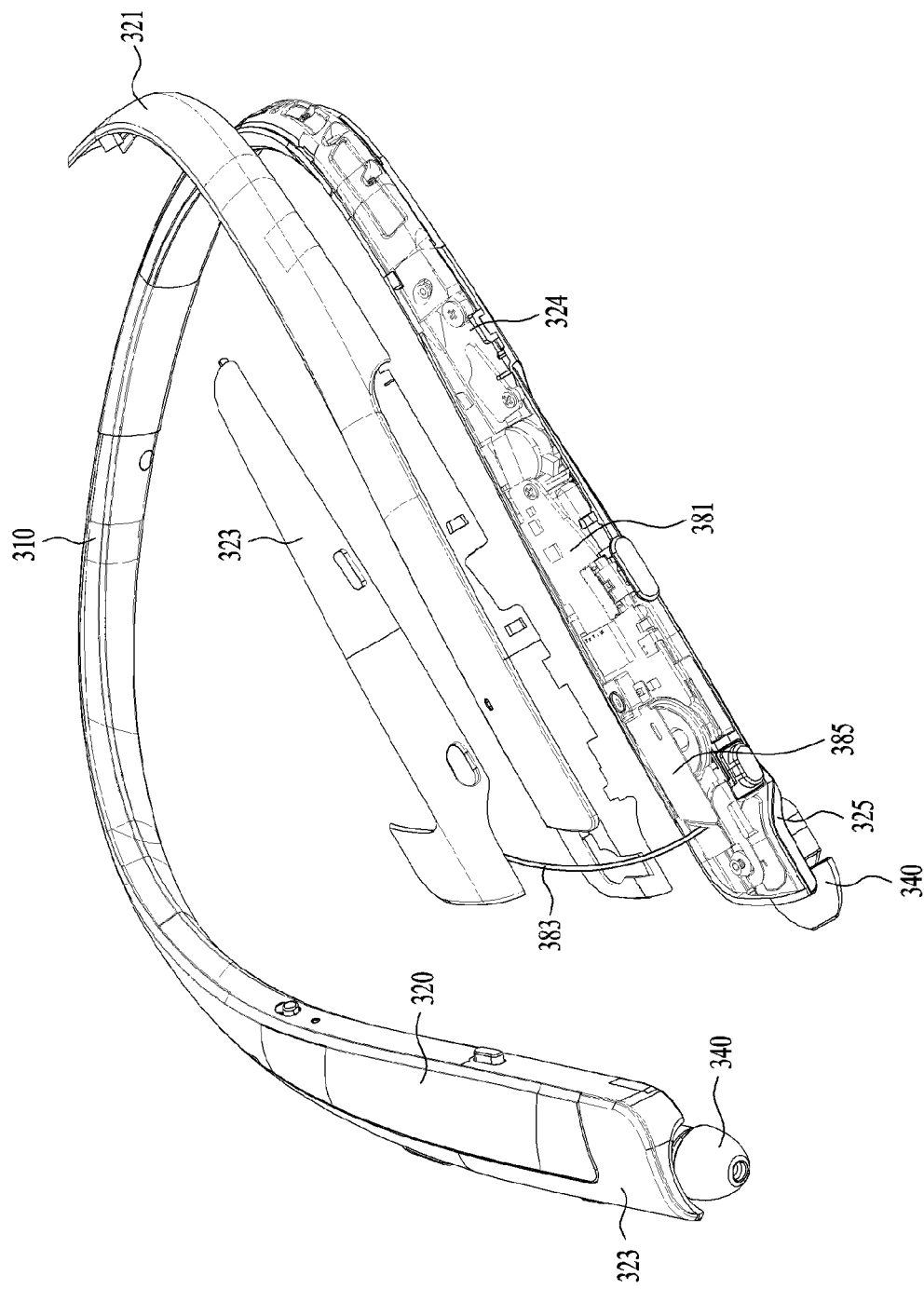
FIG. 17A is a diagram to describe one manner of coupling a metal case and an antenna module in a portable sound equipment according to another embodiment of the present invention.

FIG. 17A is a diagram to describe a manner of coupling a metal case 323 and an antenna module in a portable sound equipment according to another embodiment of the present invention. The housing 320 of the present invention includes a metal case 323 formed of metal material. If metal material is used for an exterior of the portable sound equipment 300, sense of solidity can be provided in aspect of design. Hence, the metal material is preferred in the aspect of design.

Yet, the metal material has a problem of degraded performance of antenna that radiates signals. Since the portable sound equipment 300 uses short range wireless communication (e.g., Bluetooth, NFC, etc.) for transceiving signals with another terminal by wireless for the purpose of portability, the metal case 323 becomes a factor in degrading the wireless communication performance.

In order to prevent the degradation of the wireless communication performance, signals can be radiated through the metal case 323 itself in a manner that the metal case 323 of the present invention and an antenna pattern 386, functioning as the wireless communication unit 385, are connected together. The antenna pattern 386 of the present invention, as shown in FIG. 17A, is situated in a front direction of an end portion of the body. Hence, it is able to minimize that a signal is interrupted by user's body or hair. Since the rotation module for winding the sound cable is installed in the end portion of the housing 320, the rotation module and the antenna pattern 386 may be disposed in a manner of overlapping each other. The antenna pattern 386 is connected to the main board 385 and transmits wireless signals under the control of the main board 385.

In order to connect the antenna pattern 386 and the metal case 323, an antenna hole 321a is formed in the upper case 321. Through this hole, the metal case 323 and the antenna pattern 386 can be connected to each other using an antenna connecting unit 383 including a conductive material. If a signal is transmitted with the metal case 323, the performance degradation due to metal can be avoided and the corresponding performance can be enhanced.

On the other hand, instead of using a direct scheme of using the antenna connecting unit 383 of the conductive material for the coupling of the metal case 323 and the antenna pattern 386, the metal case 323 and the antenna pattern 386 can be coupled together by an indirect scheme of using a non-conductive material.

Figure 17B:
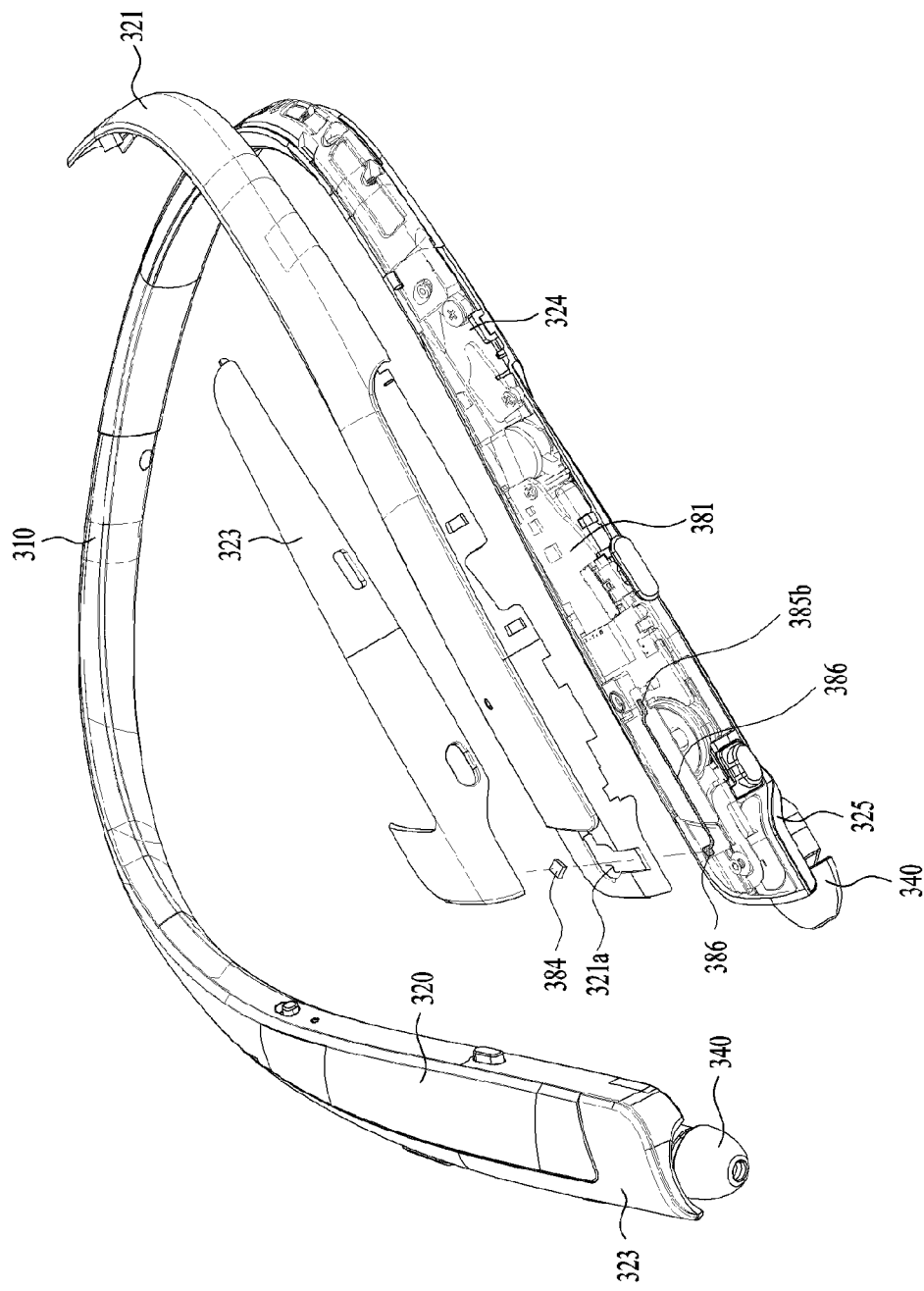
FIG. 17B is a diagram to describe another manner of coupling a metal case and an antenna module in a portable sound equipment according to another embodiment of the present invention.

FIG. 17B is a diagram to show a coupling of a metal case 323 and an antenna module according to one embodiment of the present invention. In order to use the metal case 323 as a radiation body, an end portion 386b of the antenna pattern 386 and the metal case 323 are coupled with each other by an indirect scheme, whereby a radio signal can be radiated through the metal case 323 as well.

If the metal case 323 and the whole antenna pattern 386 are disposed in a similar interval, the metal case 323 interrupts radio communication performance of the antenna pattern 386. Yet, if a specific portion 386b and the metal case 323 are coupled together, since current flows through the connected point, the flow of the current through the antenna pattern 386 is not interrupted.

Yet, in case of the direct connection, since impedance increases, it may cause a problem that a propagation loss is generated from the propagation of a high-frequency radio component. Hence, the present invention uses a coupling scheme of inserting a capacitor by disposing the metal case 323 and the antenna pattern 386 to be spaced apart from each other in a prescribed distance instead of directly connecting the metal case 323 and the antenna pattern 386 to each other.

In order to couple the antenna pattern 386 with the metal case 323 at the other end portion spaced apart from one end portion for receiving current from the main board 381, an antenna hole 321a is formed at a location corresponding to the other end portion of the antenna pattern 386 of the upper case 321, and a gasket 384 is inserted so that the metal case 323 and the antenna pattern 386 are coupled together through the antenna hole 321a.

Since the gasket 384 includes a non-conductive elastic substance and forms a layered structure formed of conductive materials on both sides, as a gap of a portion having the gasket 384 located thereat is smaller than that between the metal case 323 and the antenna pattern 386 at another point, the coupling is achieved at the gasket located portion.

Although the gasket 384 having a sandwich structure of a conductive material and a non-conductive material is not used, it is able to use a scheme of increasing a thickness of a location corresponding to the antenna hole 321a of the metal case 323 or a thickness of an end portion of the other side of the antenna pattern 386. Yet, if the gap between the metal case 323 and the antenna pattern 386 is so small, it is possible for the metal case 323 and the antenna pattern 386 to touch each other due to a shock. Hence, the gasket 384 is preferably inserted.

Instead of forming the antenna hole 321a in the upper case 321, a portion having the antenna hole 321a located thereat is formed thin and the metal case 323 is formed thick at the corresponding portion. If so, the metal case 323 and the other end of the antenna pattern 386 can be disposed closer to each other. Thus, the corresponding coupling can be achieved.

Impedance and reactance are calculated by the following formulas. As a reactance of a capacitor is inverse proportional to a size of a frequency, an impedance becomes smaller if a frequency gets higher.

$$Z = R + jX,$$

$$X = 1/j2\pi fC$$

(Z: Impedance, X: Reactance, f: Frequency)

Since Bluetooth sues a signal on a high-frequency band of 2.4~2.484 GHz, as impedance becomes small, impedance is lowered. On the other hand, since impedance increase for a signal on a low-frequency band, it brings an effect of eliminating a low frequency signal.

In a capacitor inserted circuit configuration, since a signal of DC component is filtered off, it is able to transceive a further refined signal only. Hence, performance can be further improved.

Figure 17C:
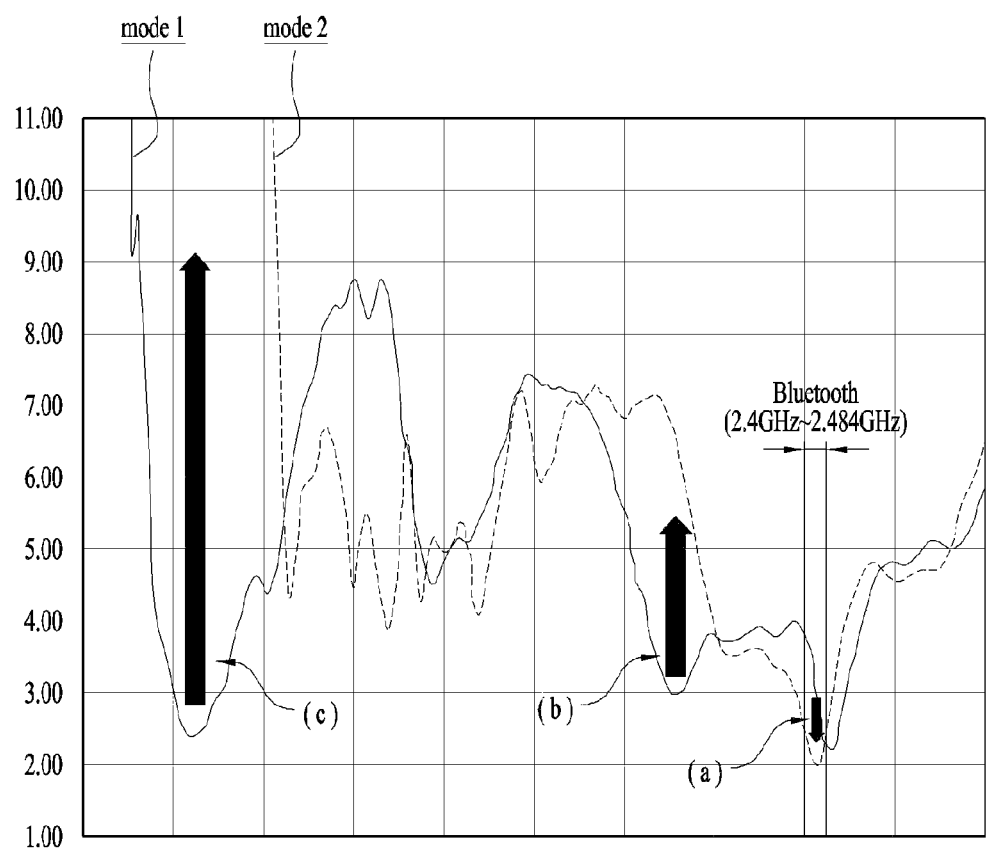
FIG. 17C is a graph to compare performance of the manner of coupling the metal case and the antenna module shown in FIG. 17A to that of the manner shown in FIG. 17B.

FIG. 17C is a graph to compare a performance of connecting the metal case 323 and the antenna pattern 386 using a conductive material (Mode 1 in FIG. 17A) to a performance of inserting the gasket 384 of the non-conductive material (More 2 in FIG. 17B). As the graph goes down toward a bottom side, performance gets better. Performance is improved on a Bluetooth frequency band (a). As impedance increases on a frequency band (b) lower than the Bluetooth frequency, a noise component is attenuated. In particular, since it brings an effect that a strength of a signal increase on the Bluetooth frequency band only, radio performance of the Bluetooth frequency band is improved.

It is applicable to a signal of a high frequency band as well as to a signal of a Bluetooth signal band. By adjusting impedance in a manner of varying a strength of a thickness current of the gasket 384, it is able to tuning an optimal resonant frequency.

Particularly, the metal case 323 is disposed on an outside (not in a direction faced by user's neck) and an end portion of the body, thereby raising radiation performance.

Figure 18:
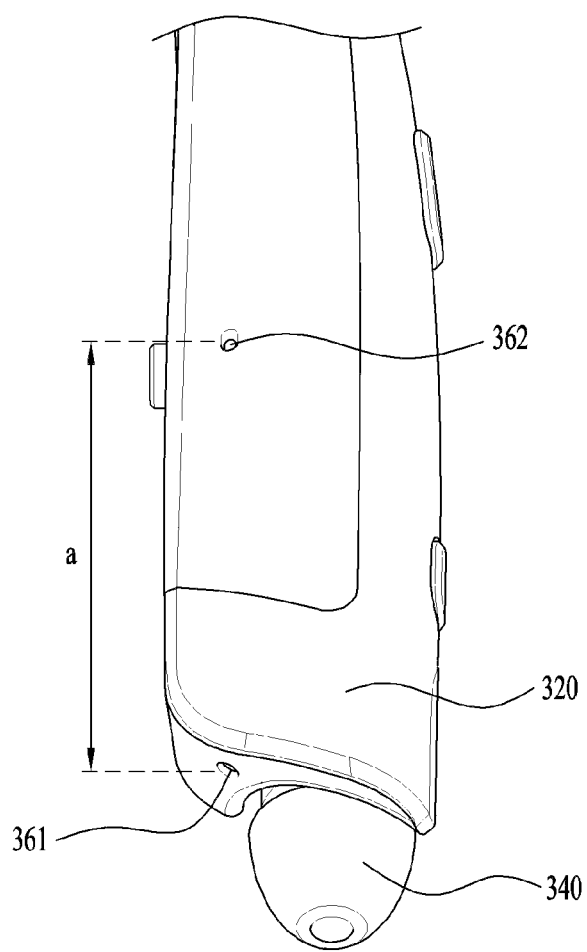
FIG. 18 is a diagram of a dual microphone in a portable sound equipment according to another embodiment of the present invention.
Figure 19:
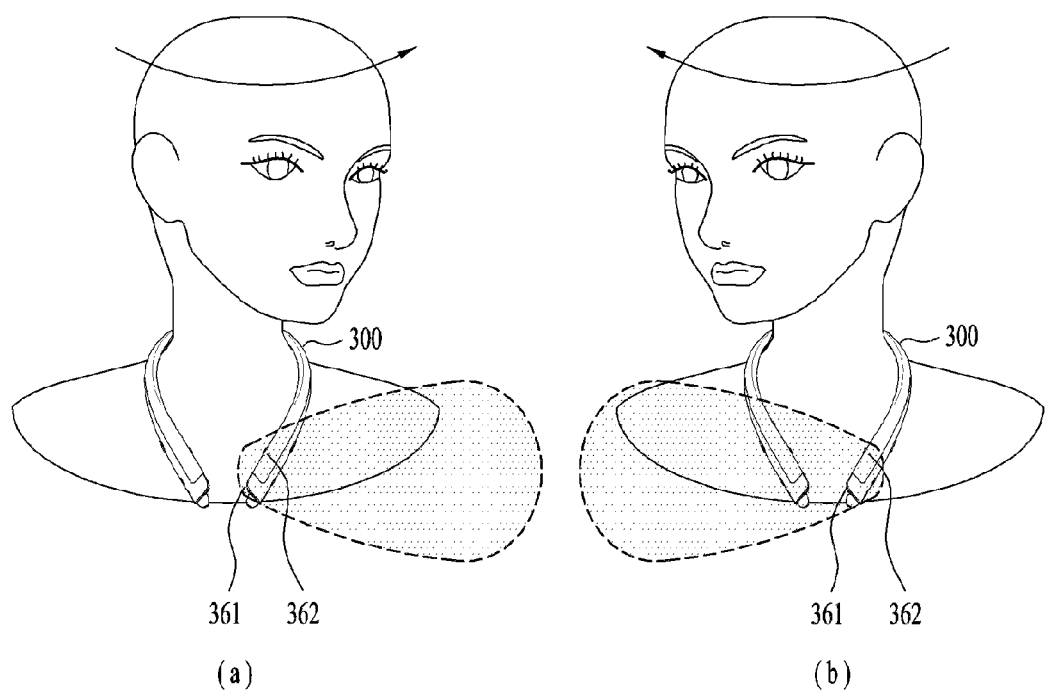
FIG. 19 is a diagram to describe performance of the dual microphone shown in FIG. 18.

FIG. 18 is a diagram of a dual microphone 360 in a portable sound equipment 300 according to another embodiment of the present invention. FIG. 19 is a diagram to describe performance of the dual microphone 360 shown in FIG. 18.

Referring to FIG. 18, the portable sound equipment 300 according to the present invention uses two microphones 361 and 362. The microphones 361 and 362 are spaced apart from each other by 'a' in a length direction of the body. Unlike a general mobile terminal, while the portable sound equipment 300 according to the present invention is worn, if user's head is moved, since a distance between a mouth and the microphone 361/362 varies, the distance from the microphone 361/362 located in the housing 320 on one side changes.

Hence, if a user faces a front side or turns user's head toward one side on which the microphones 361 and 362 are located, as shown in FIG. 19(a), it is able to sufficient sound through the first microphone 361 only. Yet, if the user turns the head toward the other side, as shown in FIG. 19(b), since the distance from the first microphone 361 increases, it is able to improve call quality by collecting sound using the second microphone 362 additionally.

Regarding the microphones 361 and 362 in consideration of the distance from user's mouth, the first microphone 361 situated slightly above the end portion of the housing 320 is used as a main microphone and the second microphone 362 disposed on the end portion of the housing 320 (i.e., near the earbud holder 325) can be used as an auxiliary microphone.

Figure 20:
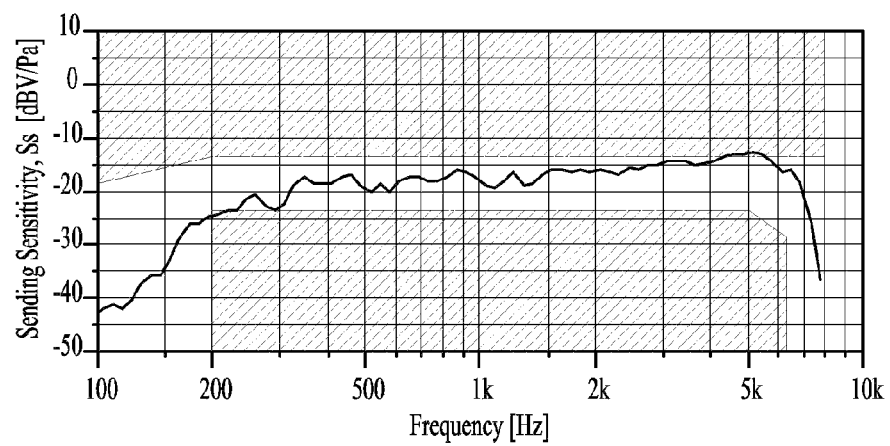
FIG. 20 is a graph of performance of the dual microphone shown in FIG. 18.

FIG. 20 is a graph of performance of the dual microphone 361/362 shown in FIG. 18. In the graph, a horizontal axis means frequency and a vertical axis indicates sensitivity. If sensitivity is too high, noise increases as well. Hence, when the sensitivity graph is situated in a shade-free region, it is able to collect audio of high quality. In case of using two microphones 361 and 362 selectively, the performance shown in FIG. 20 can be provided no matter whether a user's face is oriented towards a left or right side.

Since the second microphone situated at the end portion of the housing 320 is disposed at a location spaced apart from the main board 385, as shown in FIG. 13, it is able to further use the flexible board 386 configured to connect the second microphone 362 and the main board together. The flexible board 386 may be connected to the user input unit 327 situated at the end portion of the housing 320 as well as to the second microphone.

Figure 21:
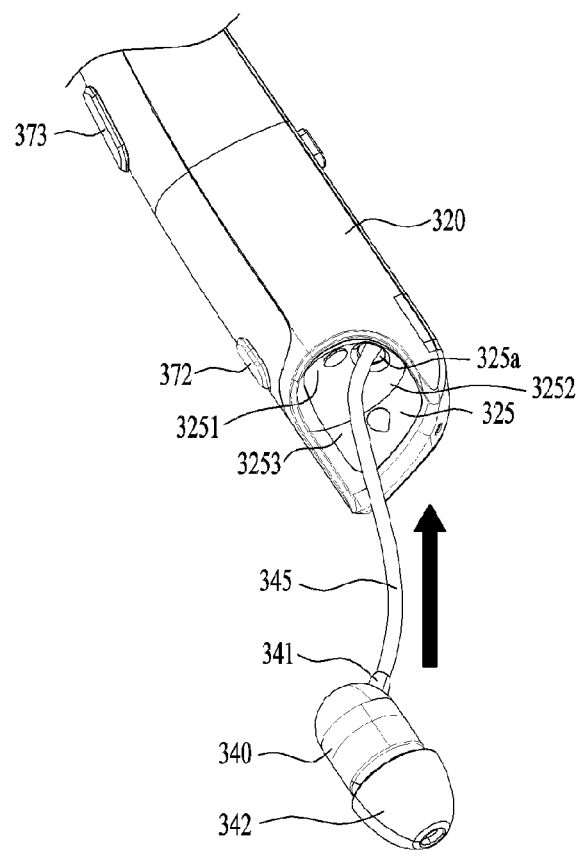
FIG. 21 is a diagram of an earbud and an earbud holder in a portable sound equipment according to another embodiment of the present invention.

FIG. 21 is a diagram of an earbud 340 and an earbud holder 325 in a portable sound equipment 300 according to another embodiment of the present invention.

In the housing 320 of the present invention, the earbud holders 325 having the earbuds 340 seated thereon are provided to both sides of the housing 320, respectively. The earbud holder 325 can be formed at the end portion of the lower case 324. Hence, when a user wears the portable sound equipment 300, the earbud holder 325 is not exposed externally.

The earbud holder 325 includes a recess concavely recessed to correspond to a shape of the earbud 340. The sound cable 345 configured to connect the earbud 340 and the main board 381 passes through the cable hole 325a formed in the earbud holder 325.

The earbud 340 is automatically coupled with the earbud holder 325 in a manner that the sound cable 345 is wound on a circumference of the rotation module 350 by the elasticity of the rotation member installed in the housing 320.

Since the related art earbud frequently causes a problem of failing to be accurately coupled with the earbud holder 325 (e.g., a problem of coupling with the earbud holder 325 askew or inverted), it is inconvenient for a user to fix the earbud 340 to be correctly coupled. The present invention improves the design of the earbud 340 and the earbud holder 325 to enable the earbud 340 to be coupled at a correct position of the earbud holder 325.

The earbud holder 325 in shape corresponding to that of the earbud 340 is used and the cable hole 325a, through which the sound cable 345 passes, formed in the earbud holder 325 is provided to an edge of one side. The earbud holder 325 includes a first portion 3251 touching the other side of the earbud 340 corresponding to a side opposite to one side on which a sound hole of the earbud 340 is formed, a second portion 3252 extending from the first portion 3251 along an extending direction of the body from an inner direction facing user's neck on which the body is worn, and a third portion 3253 extending by touching the second portion 3252 from the first portion 3251 along the extending direction of the body in a front direction of facing a front side on wearing the body on user' neck.

Assuming that a space formed by the earbud holder 325 is a hexahedral space, 3 faces are closed and 3 faces are open. And, the cable hole 325a is formed in the edge on which the first to third portions come into contact with one another. Since the earbud 340 is inserted in the earbud holder 325 by moving along the sound cable 345 toward the cable hole 325a, if the cable hole 325 is located at the edge, the first to third portions play a role in holding the earbud 340. Hence, the earbud 340 can be inserted in the earbud holder 325 in an accurate position.

A cable holder 341 for connecting the earbud 340 and the sound cable 345 together has a shape protruding from the earbud 340. The cable holder 341 includes such an elastic member as rubber and prevents the sound cable 345 from being cut by being bent. The cable holder 341 is inserted in the cable hole 325a of the earbud holder 325.

The cable hole 335a maintains an angle of about 45 degrees with the first portion 3251 and the second portion 3252 of the earbud holder 325, thereby guiding the earbud 340 to be seated on the earbud holder 325 without being distorted or twisted.

An angle between the cable holder 341 and an outer surface of the earbud 340 is formed to correspond to the angle between the cable hole 335a and the earbud holder 325, whereby the earbud 340 can be seated on a correct position without mismatch.

Accordingly, as mentioned in the foregoing description, a portable sound equipment according to the present invention provides a structure, by which influence on peripheral parts is minimized on keeping/withdrawing an earbud in/from an earbud holder by a rotation module and by which sound cable can be wound on the rotation module without being entangled.

Since the present invention provides a structure for a user to store an earbud in an earbud holder easily, the earbud can be carried conveniently.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A portable sound equipment, comprising:
   a body including an elastic part;
   an earbud holder located at the body;
   an earbud detachably seated on the earbud holder, the earbud including a sound output module configured to output sound;
   a main board located within the body, the main board being connected to the earbud to control the sound output module;
   a sound cable connecting the main board to the earbud;
   a rotation module located within the body between an end portion of the body and the main board, the rotation module being configured to allow the sound cable to be wound on an outer circumference of the rotation module;
   a bridge coupled to the body to cover one surface of the rotation module;
   a flexible board disposed along the bridge, the flexible board having a first end connected to the main board; and
   a microphone coupled to a second end of the flexible board.

2. The portable sound equipment of claim 1, wherein the bridge further comprises a cable guide projected toward the rotation module while being spaced apart a prescribed distance from a bottom surface having the rotation module coupled therewith, and
   wherein the sound cable wound on the outer circumference of the rotation module is located between the cable guide and the bottom surface.

3. The portable sound equipment of claim 2, wherein the prescribed distance between the cable guide and the bottom surface is one to three times greater than a thickness of the sound cable.

4. The portable sound equipment of claim 1, further comprising an antenna module coupled to the bridge,
   wherein a first end of the bridge is connected to the main board to radiate a wireless signal.

5. The portable sound equipment of claim 1, further comprising:
   a stopper configured to restrict rotation of the rotation module in a first direction and allow rotation of the rotation module in a second direction opposite to the first direction; and
   an elastic spring configured to rotate the rotation module in the first direction to enable the sound cable to be wound on the outer circumference of the rotation module,
   wherein, when the earbud is pulled to be unseated from the earbud holder, the rotation module is rotated in the second direction opposite to the first direction.

6. The portable sound equipment according to claim 5, wherein a portion of the stopper coming into contact with the rotation module includes steel use stainless (SUS) material.

7. The portable sound equipment of claim 5, further comprising a storage button configured to allow the rotation of the rotation module in the first direction by spacing the stopper apart from the rotation module when pressed.

8. The portable sound equipment of claim 1, wherein the earbud holder further comprises:
- a flat portion; and
- a cable hole formed in the flat portion to enable the sound cable to pass therethrough, and wherein the earbud further comprises:
- a housing configured to have the sound output module installed therein;
- a flat portion formed on one side of the housing; and
- a cable holder projected from the housing to be coupled with the sound cable.

9. The portable sound equipment of claim 8, wherein a first angle between the cable hole and the flat portion of the earbud holder corresponds to a second angle between the cable holder of the earbud and the flat portion of the earbud.

10. The portable sound equipment of claim 9, wherein the earbud holder is disposed to lean to one side at the flat portion of the earbud holder.

11. The portable sound equipment of claim 1, wherein the microphone comprises a pair of microphones disposed side-by-side.

12. The portable sound equipment of claim 1, the body further comprising:
- a lower housing configured to be coupled with the rotation module and the main board, the lower housing having the earbud holder formed at an end portion thereof; and
- an upper housing configured to cover the rotation module and the main board by being coupled with an upper part of the lower housing.

13. The portable sound equipment of claim 12, the lower housing further comprising:
- a slit formed in the earbud holder, the slit having an open side and a closed side; and
- a holder cap configured to cover the earbud holder, the holder cap having a cable hole formed in a portion corresponding to the closed side of the slit.

14. The portable sound equipment of claim 1, wherein the flexible board further comprises a switch module located on the second end, and wherein, when the switch module is pressed, the switch module generates a signal.

15. The portable sound equipment of claim 14, wherein the flexible board further comprises a button configured to press the switch module, the button being externally exposed from the body.

* * * * *